United States Patent
Ursal et al.

(10) Patent No.: US 10,282,196 B2
(45) Date of Patent: May 7, 2019

(54) SYSTEM AND METHOD FOR MOVING ENTERPRISE SOFTWARE APPLICATION COMPONENTS ACROSS ENVIRONMENTS

(71) Applicant: Oracle International Corporation, Redwood Shores, CA (US)

(72) Inventors: DJ Vasant Ursal, Austin, TX (US); Yan Rodkopf, Redwood City, CA (US); Ming W. Lam, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/782,642

(22) Filed: Mar. 1, 2013

(65) Prior Publication Data

US 2013/0268920 A1 Oct. 10, 2013

Related U.S. Application Data

(60) Provisional application No. 61/621,400, filed on Apr. 6, 2012, provisional application No. 61/622,400, filed
(Continued)

(51) Int. Cl.
*G06F 9/44* (2018.01)
*G06F 8/70* (2018.01)
*G06F 8/60* (2018.01)

(52) U.S. Cl.
CPC . *G06F 8/70* (2013.01); *G06F 8/60* (2013.01)

(58) Field of Classification Search
CPC .......................................................... G06F 9/44
(Continued)

(56) References Cited

U.S. PATENT DOCUMENTS 7,356,679 B1 * 4/2008 Le et al. ........................... 713/1
7,941,510 B1 * 5/2011 Tormasov et al. ............ 709/220
(Continued)

FOREIGN PATENT DOCUMENTS

CA 2807983 A1 * 8/2011 ............... G06F 9/44

OTHER PUBLICATIONS

Non-patent website Steve Rachui's Manageability blog—ConfigMgr/OpsMgr [online] Mar. 2007 [retrieved on Aug. 20, 2014] retrieved from internet <http://blogs.msdn.com/b/steverac/archive/2007/03/20/sccm-2007-binary-delta-replication-aspx>.*
(Continued)

*Primary Examiner* — Jae U Jeon
(74) *Attorney, Agent, or Firm* — Tucker Ellis LLP

(57) ABSTRACT

A system and method for application lifecycle management, including moving enterprise software application components, such as Oracle Fusion Application components, across different environments. In accordance with an embodiment, the task of moving the application components from a first/source environment to another second/target environment is simplified by movement tools, including a user interface for use by an administrator in moving component binaries and configuration information. The system can be used to minimize the amount of work that would otherwise be required to reapply customization and configuration changes that were made in the source environment, to the target environment. Various types of movement scenarios are also described.

17 Claims, 18 Drawing Sheets

Related U.S. Application Data on Apr. 10, 2012, provisional application No. 61/660,560, filed on Jun. 15, 2012.

(58) Field of Classification Search
USPC .................................. 717/101, 102, 103, 177
See application file for complete search history.

(56) References Cited

U.S. PATENT DOCUMENTS

| | | | | |
|---|---|---|---|---|
| 2003/0133136 | A1* | 7/2003 | Ohishi | G06T 1/00 358/1.1 |
| 2004/0111428 | A1* | 6/2004 | Rajan | G06F 8/30 |
| 2005/0081157 | A1* | 4/2005 | Clark | G06F 11/3495 715/736 |
| 2005/0251809 | A1* | 11/2005 | Gunduc et al. | 719/310 |
| 2007/0245332 | A1* | 10/2007 | Tal | G06F 8/65 717/168 |
| 2009/0048997 | A1* | 2/2009 | Manickam et al. | 706/47 |
| 2010/0162201 | A1* | 6/2010 | Shnaiderman | G06F 8/71 717/101 |
| 2010/0325624 | A1* | 12/2010 | Bartolo | G06F 8/61 717/176 |
| 2011/0035755 | A1* | 2/2011 | Huang et al. | 718/106 |
| 2012/0102457 | A1* | 4/2012 | Tal | G06F 8/65 717/121 |
| 2012/0131391 | A1 | 5/2012 | Musolff | |
| 2012/0198019 | A1 | 8/2012 | Thomas et al. | |
| 2012/0284696 | A1* | 11/2012 | Koskinen | G06F 8/447 717/126 |
| 2013/0006650 | A1 | 1/2013 | Bocirnea et al. | |

OTHER PUBLICATIONS

Non-patent website Anurag, Reminisce of an ConfigMgr Engineer—(ConfigMgr: Binary Delta Replication Explained) Technicalxpress) [online] Aug. 2011 [retrieved on Aug. 20, 2014] retrieved from internet <http://sccmt.wordpress.com/2011/08/03/configmgr-binary-delta-replication-explained/.*

Shubhashree Thekahally. Application Retirement Process—An Objectstream White Paper [online] May 2011 [retrieved on Aug. 20, 2014] retrieved from internet <http://www.objectstream.com/images/ARP-WhitepaperV2.0.pdf>, pp. 1-8.*

IBM. Enterprise Data Management Solutions—Application retirement: enterprise data management strategies for decommissioning projects [online] Apr. 2008 [retrieved on Aug. 20, 2014] retrieved from internet <http://www-07.ibm.com/events/nz/ibmforum/kiosk/resellers/pdf/b17.pdf>pp. 1-20.*

Moving from a Test to a Production Environment (Oracle Fusion Middleware Administrator's Guide) [Online] 2009 [retrieved on Aug. 19, 2014] retrieved from internet <http://docs.oracle.com/cd/E21764_01/core.1111/e10105/testprod.htm>.*

WDP ("Weblogic Deployment Plan"), May 2010.*

WDP ("Weblogic Deployment Plan"), May 2010 (Year: 2010).*

Enterprise Service Bus, Version 7.5—Migration Methods, Feb. 6, 2013, http://publib.boulder.ibm.com/infocenter/esbsoa/webv7r5/index.jsp?topic=%2Fcom.ibm.websphere.wesb.install.doc%2Ftopics%2Fcmig_vtv_migtypes.html, 3 pages.

Microsoft Dynamics AX 2012 Implementation Planning Guide, Apr. 2011, http://www.google.co.in/url?q=http://dynamicsuser.net/cfs-filesystemfile.ashx/_key/CommunityServer.Components.UserFiles/00.00.05/83.62/DynamicsAX2012_5F00_ImplementationPlanning-Guide.pdf&sa=U&ei=COMRUa_6EoTmrAfn54HQCQ&ved=0CB4QFjAF&usg=AFQjCNGTZHi5N6nqj2QGcs, 40 pages.

In Microsoft Dynamics AX 2012 how to copy configuration and setup data from one environment to another environment, Feb. 6, 2013, http://eprogrammers.blogspot.in/2012/01/in-microsoft-dynamics-ax-2012-how-to.html, 6 pages.

Migrating Extended Data Type Relations in Microsoft Dynamics AX 2012, http://go.microsoft.com/fwlink/?LinkID=213126&clcid=0x409, 28 pages.

A Framework for Migrating Production Snapshots of Composite Applications to Virtualized Environments 2011, http://ieeexplore.ieee.org/stamp/stamp.jsp?arnumber=5990562, pp. 578-586.

Double-Take Move®—Migrations Made Easy, Feb. 6, 2013, http://www.visionsolutions.com/products/dt-move.aspx, 1 page.

Configuring and Managing WebLogic JDBC, Feb. 6, 2013, http://docs.oracle.com/cd/E15051_01/wls/docs103/jdbc_admin/config.html, 8 pages.

Moving applications into another environment, Feb. 6, 2013, http://help.adobe.com/en_US/livecycle/10.0/WorkbenchHelp/WS92d06802c76abadb4967b0e31284028928e-7fe5.html, 4 pages.

* cited by examiner

SYSTEM AND METHOD FOR MOVING ENTERPRISE SOFTWARE APPLICATION COMPONENTS ACROSS ENVIRONMENTS

CLAIM OF PRIORITY

This application claims the benefit of priority to U.S. Provisional Patent Application titled "SYSTEM AND METHOD FOR MOVING SOFTWARE APPLICATION COMPONENTS ACROSS ENVIRONMENTS"; Application No. 61/621,400, filed Apr. 6, 2012; U.S. Provisional Patent Application titled "SYSTEM AND METHOD FOR MOVING SOFTWARE APPLICATION COMPONENTS ACROSS ENVIRONMENTS"; Application No. 61/622,400, filed Apr. 10, 2012; and U.S. Provisional Patent Application titled "SYSTEM AND METHOD FOR MOVING SOFTWARE APPLICATION COMPONENTS ACROSS ENVIRONMENTS"; Application No. 61/660,560, filed Jun. 15, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to enterprise software applications, such as Oracle Fusion Applications, and are particularly related to systems and methods for moving enterprise software application components across different environments.

BACKGROUND

Replicating an enterprise software application environment, such as an Oracle Fusion Applications environment, from an original environment to a new environment, typically requires manually moving and then reconfiguring the various enterprise application components between the two environments. Often, this requires considerable effort on the part of a system administrator to reapply those customization and configuration changes that were made in the original environment to the new environment. Manual reconfiguration can introduce errors, and it can be difficult to make adjustments to the configuration to better suit the new environment. These are the general areas that embodiments of the invention are intended to address.

SUMMARY

In accordance with an embodiment, described herein is a system and method for application lifecycle management, including moving enterprise software application components, such as Oracle Fusion Application components, across different environments. In accordance with an embodiment, the task of moving the application components from a first/source environment to another second/target environment is simplified by movement tools, including a user interface for use by an administrator in moving component binaries and configuration information. The system can be used to minimize the amount of work that would otherwise be required to reapply customization and configuration changes that were made in the source environment, to the target environment. Various types of movement scenarios are also described.

BRIEF DESCRIPTION OF THE FIGURES

FIG. 5 further illustrates a user interface for use in moving components of an enterprise software application, in accordance with an embodiment.

FIG. 6 further illustrates a user interface for use in moving components of an enterprise software application, in accordance with an embodiment.

DETAILED DESCRIPTION

Figure 1:
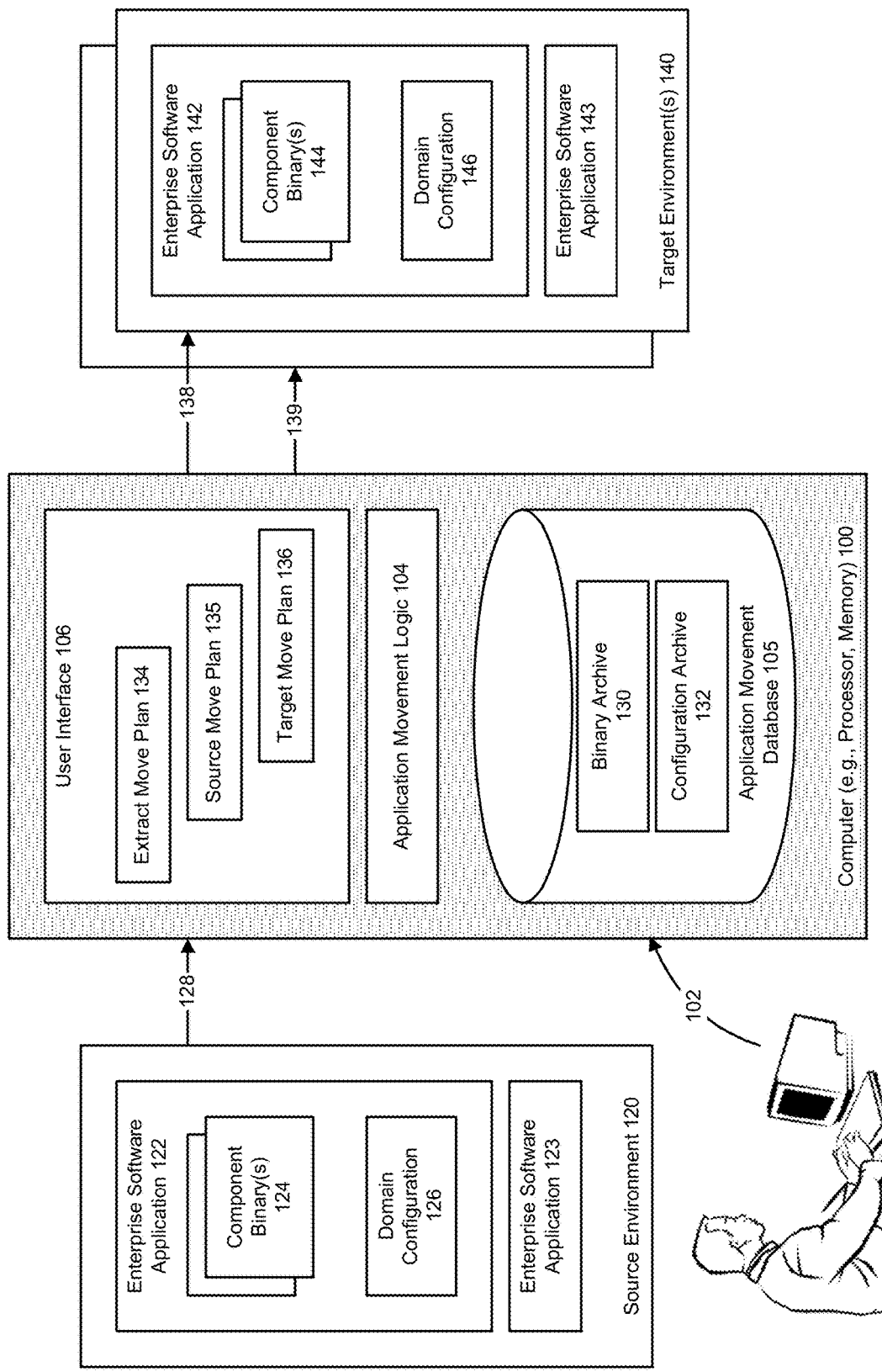
FIG. 1 illustrates a system for use in moving components of an enterprise software application between different execution environments, in accordance with an embodiment.

As described above, replicating an enterprise software application environment, from an original environment to a new environment, typically requires manually moving and reconfiguring the various enterprise application components between the two environments, which in turn requires considerable effort, and can introduce errors.

In accordance with an embodiment, described herein is a system and method for application lifecycle management, including moving enterprise software application components, such as Oracle Fusion Application components, across different environments. In accordance with an embodiment, the task of moving the application components from a first/source environment to another second/target environment is simplified by movement tools, including a user interface for use by an administrator in moving component binaries and configuration information. The system can be used to minimize the amount of work that would otherwise be required to reapply customization and configuration changes that were made in the source environment, to the target environment.

Glossary

In accordance with an embodiment, some of the following terms are used herein. In accordance with other embodiments, other terms can be used:

Oracle home: An Oracle home contains installed files necessary to host a specific product. For example, the SOA Oracle home includes a directory that contains binary and library files for Oracle SOA Suite. Each Oracle home can be associated with multiple instances or Oracle WebLogic Server domains.

WebLogic Server home: A WebLogic Server home contains installed files necessary to host a WebLogic Server instance. The WebLogic Server home directory is a peer of the Oracle home directories and resides within the directory structure of the middleware home.

Middleware home: A middleware home includes the Oracle WebLogic Server home, and optionally one or more Oracle homes. A middleware home can reside on a local file system, or on a remote shared disk that is accessible through, e.g., NFS.

Oracle instance: An Oracle instance contains one or more active middleware system components, for example Oracle Web Cache, Oracle HTTP Server or Oracle Internet Directory. An administrator can determine which components are part of an instance, either at install time or by creating and configuring an instance at a later time. An Oracle instance contains files that can be updated, such as configuration files, log files, and temporary files.

Domain: A domain is the basic administrative unit of Oracle WebLogic Server.

Managed Server: Managed servers host business applications, application components, Web services, and their associated resources. To optimize performance, managed servers maintain a read-only copy of the domain's configuration document. When a managed server starts, it connects to the domain's administration server to synchronize its configuration document with the administration server.

Failover: When a member of a high availability system fails unexpectedly, in order to continue offering services to its consumers, the system can undergo a failover operation.

Failback: After a system undergoes a successful failover operation, the original failed member can be repaired over time and be re-introduced into the system as a standby member.

Hardware cluster: A hardware cluster is a collection of computers that provides a single view of network services (e.g., an IP address) or application services (e.g., databases, Web servers) to clients of these services.

Cluster agent: A cluster agent is a software that runs on a node member of a hardware cluster that coordinates availability and performance operations with other nodes.

Clusterware: Clusterware is a software that manages the operations of the members of a cluster as a system.

Shared storage: Shared storage is the storage subsystem that is accessible by all of the computers in the enterprise deployment domain.

Primary node: A primary node is the node that is actively running an Oracle Fusion Applications instance at any given time and has been configured to have a backup/secondary node. If the primary node fails, the Oracle Fusion Applications instance is failed over to the secondary node.

Secondary node: A secondary node is a backup node for an Oracle Fusion Applications instance. This is where the active instance fails over when the primary node is no longer available.

Network host name: Network host name is a name assigned to an IP address either through the /etc/hosts file or through DNS resolution. This name is visible in the network that the computer to which it refers to is connected.

Physical host name: A physical host name is used by Oracle Fusion Middleware to reference the local host.

Physical IP: The physical IP refers to the IP address of a computer on the network. In most cases, it is normally associated with the physical host name of the computer. In contrast to a virtual IP, it is always associated with the same computer when on a network.

Switchover: During normal operation, active members of a system may require maintenance or upgrading. A switchover process can be initiated to allow a substitute member to take over the workload performed by the member that requires maintenance or upgrading, which undergoes planned downtime.

Switchback: When a switchover operation is performed, a member of the system is deactivated for maintenance or upgrading. When the maintenance or upgrading is completed, the system can undergo a switchback operation to activate the upgraded member and bring the system back to the pre-switchover configuration.

Virtual host name: Virtual host name is a network addressable host name that maps to one or more physical computers via a load balancer or a hardware cluster.

Virtual IP: Generally, a virtual IP can be assigned to a hardware cluster or load balancer. To present a single system view of a cluster to network clients, a virtual IP serves as an entry point IP address to the group of servers which are members of the cluster. A virtual IP can be assigned to a server load balancer or a hardware cluster.

Hardware Cluster: A hardware cluster uses a cluster virtual IP to present, to the outside world, the entry point into the cluster (it can also be set up on a standalone computer).

Load Balancer: A load balancer also uses a virtual IP as the entry point to a set of servers.

FIG. 1 illustrates a system for use in moving components of an enterprise software application between different execution environments, in accordance with an embodiment. As shown in FIG. 1, the system can utilize a computer (e.g., a computer device or server including a microprocessor and memory) 100, under control of an administrator or other user 101, which includes an application movement logic 104, an application movement database 105, and a user interface 106.

In accordance with an embodiment, the administrator can specify a source environment 120 that includes one or more source instances of enterprise software applications 122, 123, such as Oracle Fusion Middleware or Oracle Fusion Applications, each of which includes one or more component binaries 124, and a domain configuration 126, that can be read 128 by the system.

In accordance with an embodiment, the application movement database can be used by the application movement logic to store a binary archive 130, and a configuration archive 132. The user interface can be used by the administrator to edit or otherwise specify one or more extract move plans 134, source move plans 135, and/or target move plans 136, or other movement configuration. The enterprise software application components which are copied from the source environment, and stored in the binary archive and configuration archive, can then be written 138, 139, in accordance with the user-specified move plans, to one or more target environments 140, as target instances of the enterprise software applications 142, 143, each of which target instance includes the appropriate component binaries 144 and domain configuration 146.

In accordance with an embodiment, the system can include a movement application program interface, and each component of the enterprise software application can be associated with a plugin that enables binaries and configuration artifacts associated with that component to be imported from a source environment, and exported to a target environment.

Typically, an enterprise software application, such as Fusion Applications, is installed, configured, customized, and validated in a source environment, at a source computer system, such as a test environment. Once the source environment is stable and performs as desired, a target environment, at a destination computer system, such as a production environment, can then be created by moving all of the components from the source environment, instead of redoing all of the changes that were incorporated into that source environment.

In accordance with various embodiments, the movement of enterprise software application components from one environment to another can be performed according to a variety of different movement scenarios.

For example, in a full-movement scenario, the target environment does not initially exist. In this scenario, the source environment is first created, configured, customized, and tested. Then, the target environment is created by moving all of the components along with their configurations from the source environment.

In accordance with various embodiments, other types of movement scenario can be used, as described in further detail below. When moving an enterprise software application from a source environment to a target environment, the following guidelines apply:

The source and target environments must share the same operating system and the same platform architecture. For example, components and their configurations cannot be moved from a source environment running Microsoft Windows to a target environment running UNIX; or from a source environment having a 32-bit platform to a target environment having a 64-bit platform.

The source and target environments must have identical topologies. Changes to the target environment topology can be made post-movement.

The enterprise software application domain name must not be changed in the provisioned environment or while performing the full-movement tasks. For example, in a Fusion Applications environment, the path relative to APPLICATIONS_CONFIG that is used while moving the domain and system components should be the same as the path used in the provisioned source environment.

The common domain should be moved to the target environment first.

Upon completion of, e.g., a full-movement scenario, a variety of artifacts are moved from the source environment to the target environment. Examples of such artifacts include seed data created with Fusion Middleware Repository Creation Utility (RCU) in the target environment; Oracle WebLogic Server domain configuration stored in the file system; system component configuration stored in the file system, configuration and metadata; and security artifacts created by the Fusion Applications Provisioning framework, such as application IDs, and policies.

Depending on the needs of a particular enterprise application customer and movement scenario, some artifacts may not be moved to the target environment, e.g., transactional data, which is assumed to be test transactions; and transient data, such as job status and process status.

The above examples are provided by way of illustration. In accordance with other embodiments, other types of artifacts can be used.

By way of example, in a typical Fusion Applications environment, there are a number of WebLogic Server domains and system component instances. If the administration servers of all of these domains and all of the system component instances run on the same host, then the environment is considered a non-distributed environment. In all other cases, the environment is considered a distributed environment. In accordance with an embodiment, moving of enterprise software application artifacts and binaries, between source and target environments, requires the administrator perform the following tasks:

Complete any prerequisite tasks. Before beginning to move the enterprise software application components across environments, the administrator must prepare the source environment, and the target environment.

Use the system to copy the identity management domain component artifacts. For example, in a Fusion Applications environment, the administrator must move the Fusion Applications related artifacts for Oracle Identity Management from the source domain to the target domain. In accordance with an embodiment, the artifacts created by Fusion Applications provisioning in the source domain are distributed across a number of identity management products, e.g., Oracle Internet Directory (used as the identity store and policy store), Oracle Virtual Directory (used as the identity store), Oracle Access Manager, Oracle Identity Manager, and Oracle Identity Federation.

Copy the enterprise software application binaries, i.e., the installed applications or components, along with any applied patches in the source environment, as an archive that can be applied to the target environment to move the enterprise software application binary files.

Copy the configurations of each domain or instance from the source environment to the target environment. For example, in a Fusion Applications environment, for each Fusion Application, the administrator must move the configurations of each WebLogic Server domain, OHS instance, and Node Manager that is part of the source environment, to the target environment. Some environments are non-distributed, whereby the administration servers of all of the domains and all of the system component instances run on the same host; for these environments, the administrator can automate moving binary and configuration files with an appropriate set of steps than those provided.

Apply the setup configuration data of the source environment to the target environment. In accordance with an embodiment, a Functional Setup Manager enables administrators to implement and configure Fusion Applications, as well as to move the setup data across instances. An Application Implementation Consultant can be used by the administrator to move setup data using the Functional Setup Manager's export and import functionality.

Complete any post-movement tasks. For example, in a distributed Fusion Applications environment, after moving the Fusion Applications components across environments, the administrator must complete the tasks of reconciling GUIDs and security policies; applying any necessary topology changes, such as scaling up or scaling out the topology; completing the Oracle RAC configuration in the target environment; starting managed servers as needed; and starting index schedules.

Figure 2:
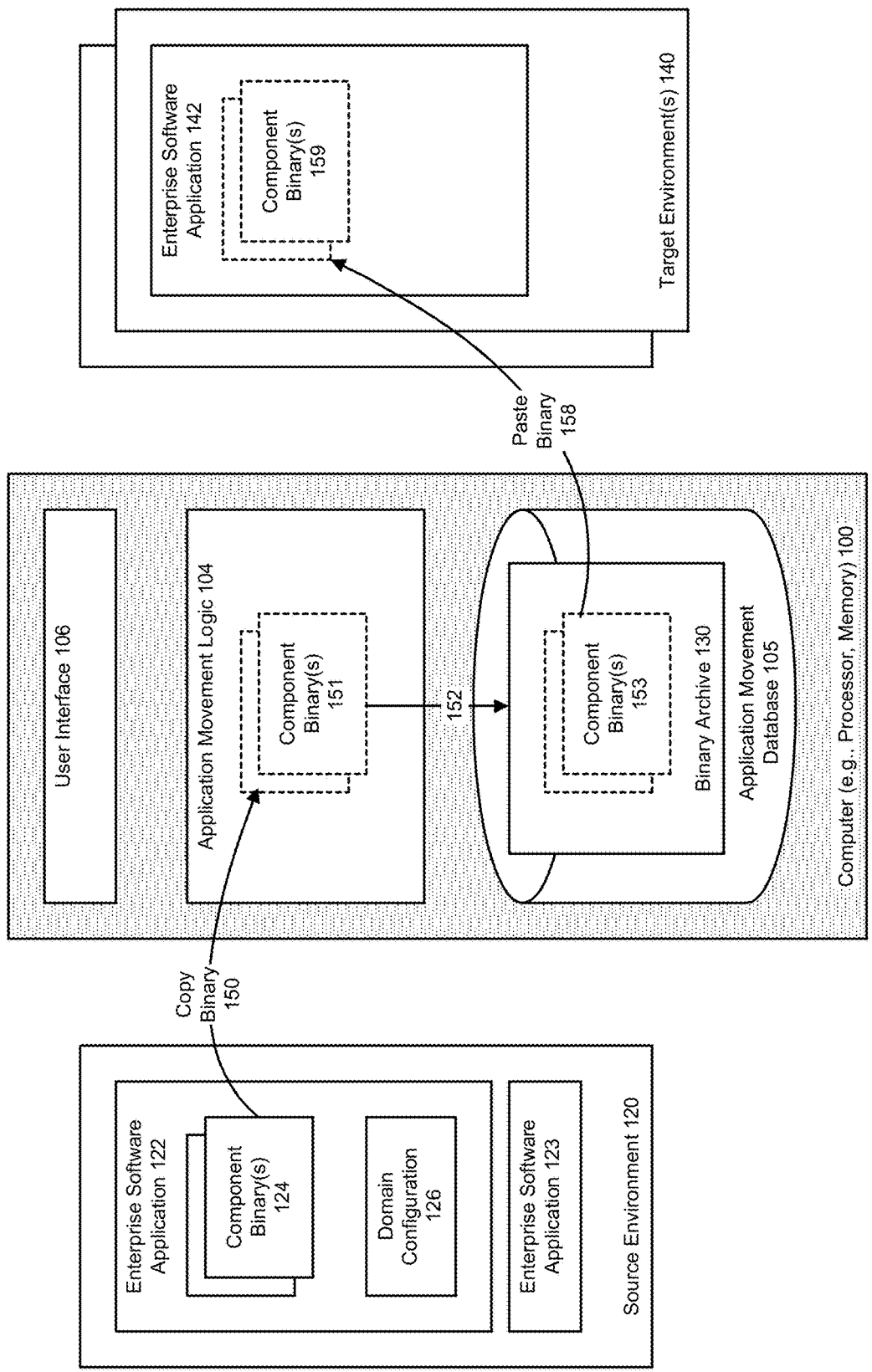
FIG. 2 illustrates moving component binaries of an enterprise software application between different execution environments, in accordance with an embodiment.

FIG. 2 illustrates moving component binaries of an enterprise software application between different execution environments, in accordance with an embodiment. As shown in FIG. 2, in accordance with an embodiment, by using one or more extract move plans, source move plans, target move plans, or other movement configuration, the enterprise application's component binaries can be copied from the source environment 150, 151, 152, by the application movement logic, to the binary archive 153, where they can be later pasted 158, as component binaries 159, to the target environment.

Figure 3:
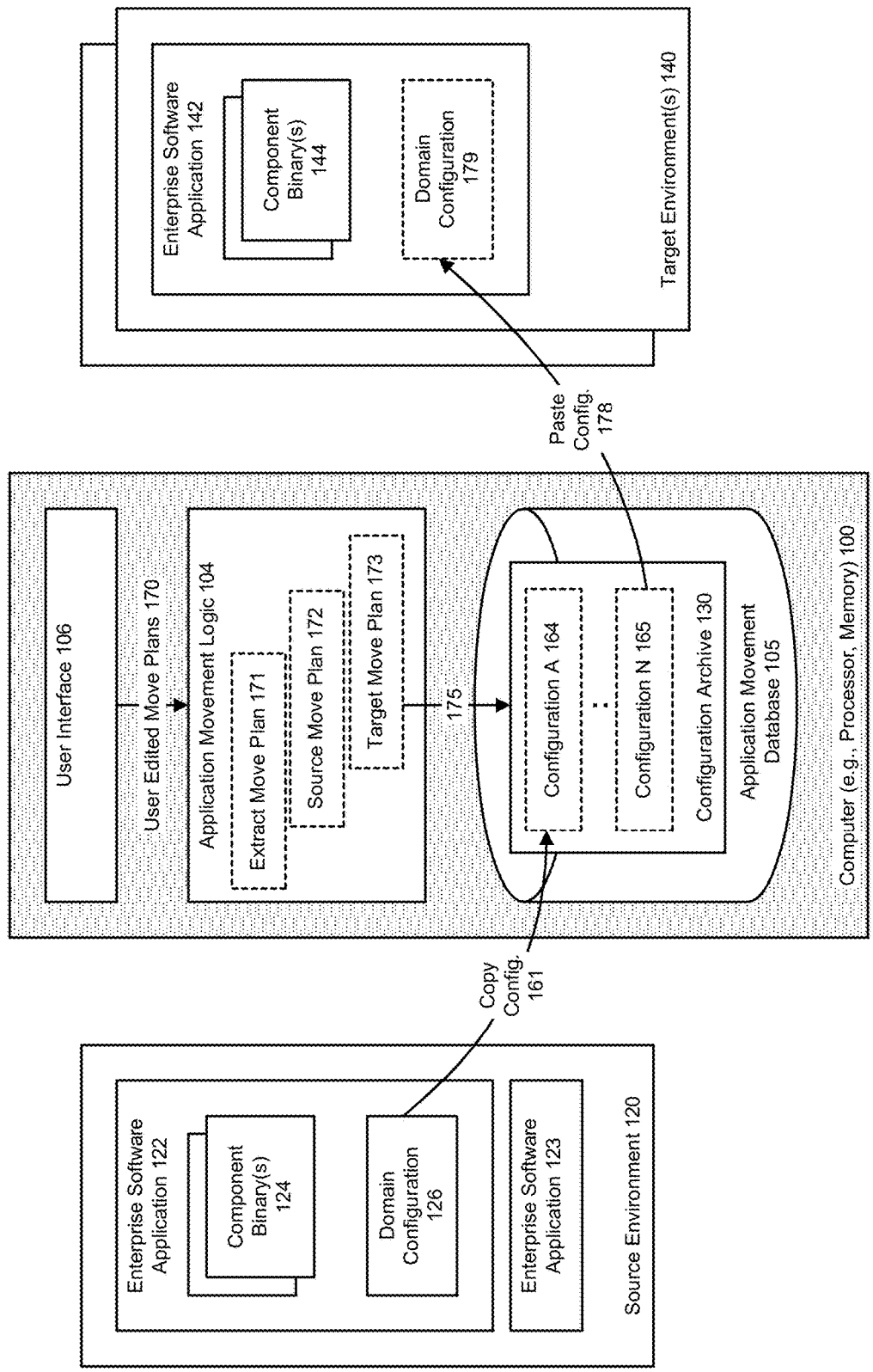
FIG. 3 illustrates moving a domain configuration of an enterprise software application between different execution environments, in accordance with an embodiment.

FIG. 3 illustrates moving a domain configuration of an enterprise software application between different execution environments, in accordance with an embodiment. As shown in FIG. 3, in accordance with an embodiment, a source domain configuration can be copied 161 from one or more enterprise software applications, by the application movement logic, to the configuration archive, and stored therein as a plurality of configurations 164, 165.

In accordance with an embodiment, the user interface can be used by the administrator to edit the move plans 170, including the extract move plans 171, source move plans 172, target move plans 173, or other movement configuration, for use on or with 175 a specified configuration. The resultant configuration can then be pasted 178, as a domain configuration 179, to the target environment.

In accordance with an embodiment, the task of moving the application components from the source environment to the target environment can be simplified by providing a variety of movement tools (e.g., user interfaces and/or scripts for use by an administrator in moving component binaries and configuration information). These movement tools can be used to minimize the amount of work that would otherwise be required to reapply all of the customization and configuration changes made in one environment, to another environment.

As described above, an enterprise software application is typically installed, configured, customized, and validated in a source environment, such as a test environment; and subsequently a target environment, such as a production environment, can be created by moving all of the components from the source environment. As used herein, the terms test-to-production (T2P), and production-to-test (P2T), are used respectively to refer to the task of moving application components from one test or production environment to another test or production environment. However, the term T2P is not intended to be restrictive or imply only movements from a test environment to production environment, but is used in a generic sense to include movements from any staging or source environment to a production target; similarly, the term P2T is used in a generic sense to include such movements as from production to staging, or production to testing.

In accordance with an environment that includes, e.g., Oracle Identity Management and WebLogic Server components, the following approach can be used:

Complete the prerequisite tasks, as described above.

Use the system to move the Oracle Identity Management domain component artifacts.

Copy the binaries (the installed applications or components along with any applied patches) from the source environment, and apply the archive to the target environment to move the Fusion Applications binary files. In accordance with an embodiment, this can be performed either by using the user interface, or by running an, e.g., copyBinary script, for each Middleware home in the source environment, to create the binary archives; applying copied binary files from the source environment to the target environment by running an, e.g., pasteBinary script, in the target environment; and moving the dbclient installation.

Copy the configurations of each, e.g., WebLogic Server domain, OHS instance, and Node Manager in Fusion Applications, from the source environment to the target environment. In accordance with an embodiment, this can be performed using the user interface, or by running a copyConfig script for each WebLogic Server domain, OHS instance, and Node Manager in the source environment to create the configuration archives; extracting the move plan by running the extractMovePlan script on the list of configuration archive locations; modifying the move plan to specify properties for the target environment; applying the copied configurations from the source environment to the target environment by running the pasteConfig script for each WebLogic Server domain, OHS instance, and Node Manager separately, using the same move plan; if there are multiple machines for the domain, recreate the local domain directory using the WebLogic Server pack and unpack mechanisms; and, completing the component-specific configuration move by performing additional movement tasks on the Fusion Middleware components.

Apply the setup configuration data of the source environment to the target environment.

Complete the post-movement tasks, as described above.

FIGS. 4-7 illustrate a user interface for use in moving components of an enterprise software application between different execution environments, in accordance with an embodiment.

Figure 4:
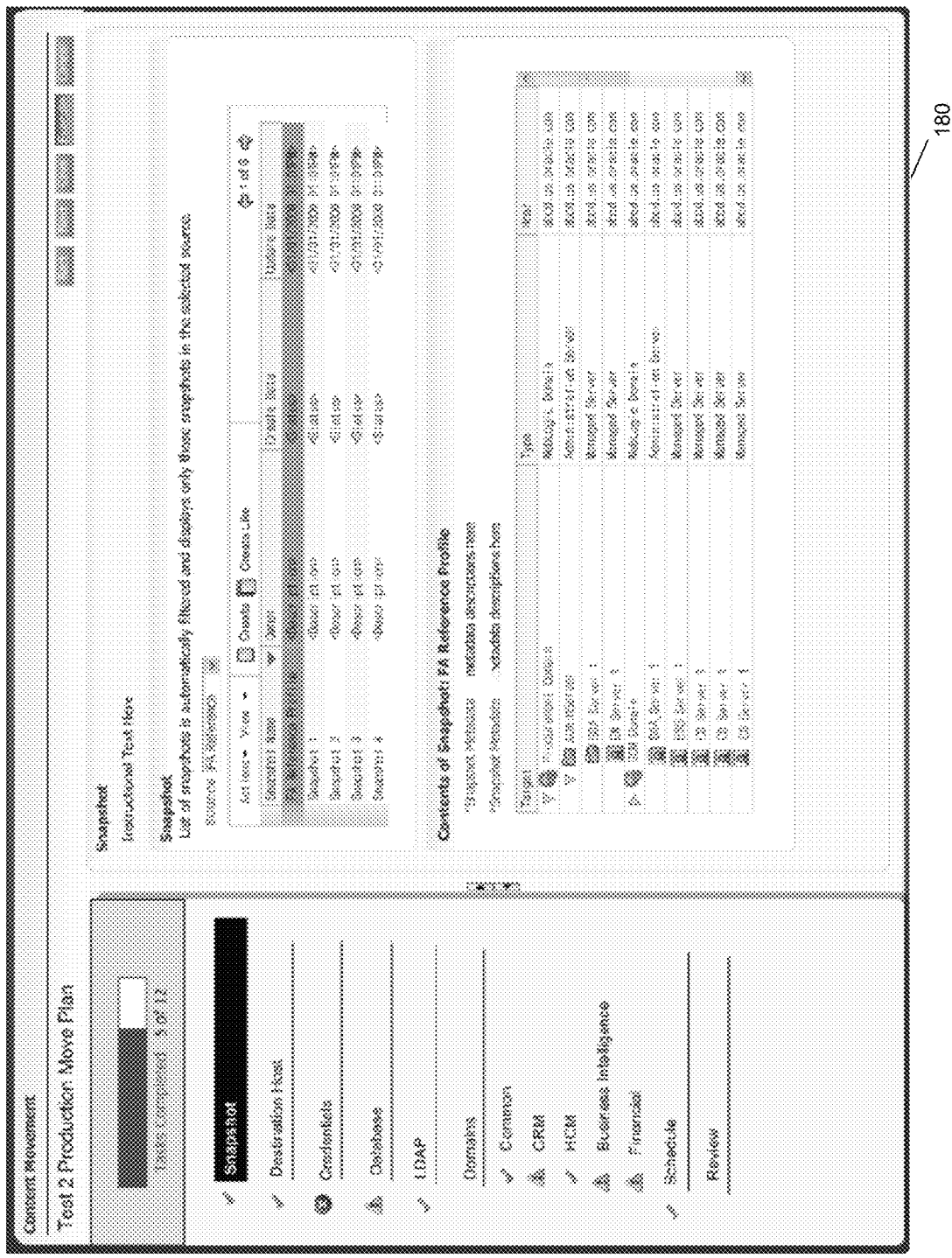
FIG. 4 illustrates a user interface for use in moving components of an enterprise software application between different execution environments, in accordance with an embodiment.
Figure 5:
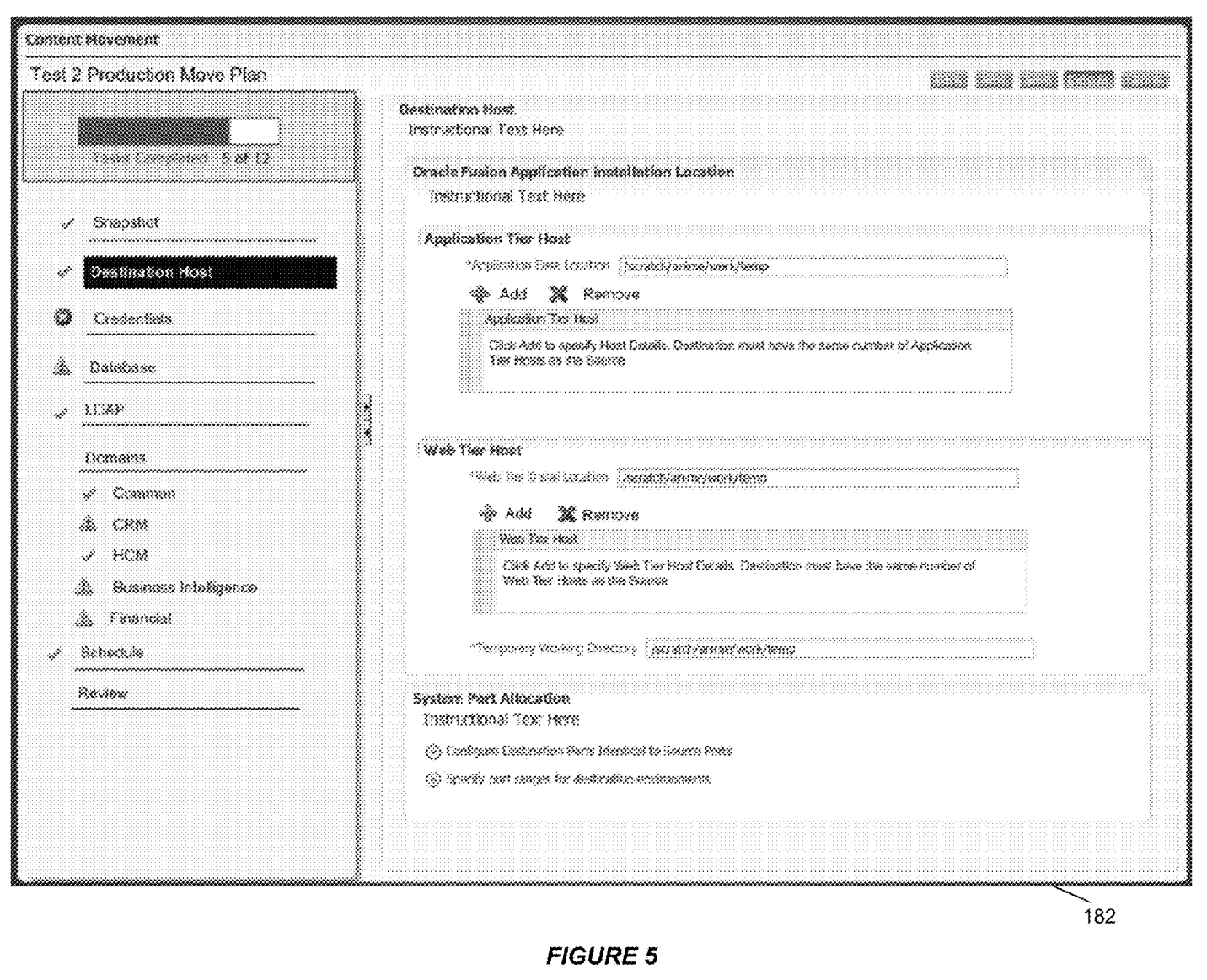
Figure 6:
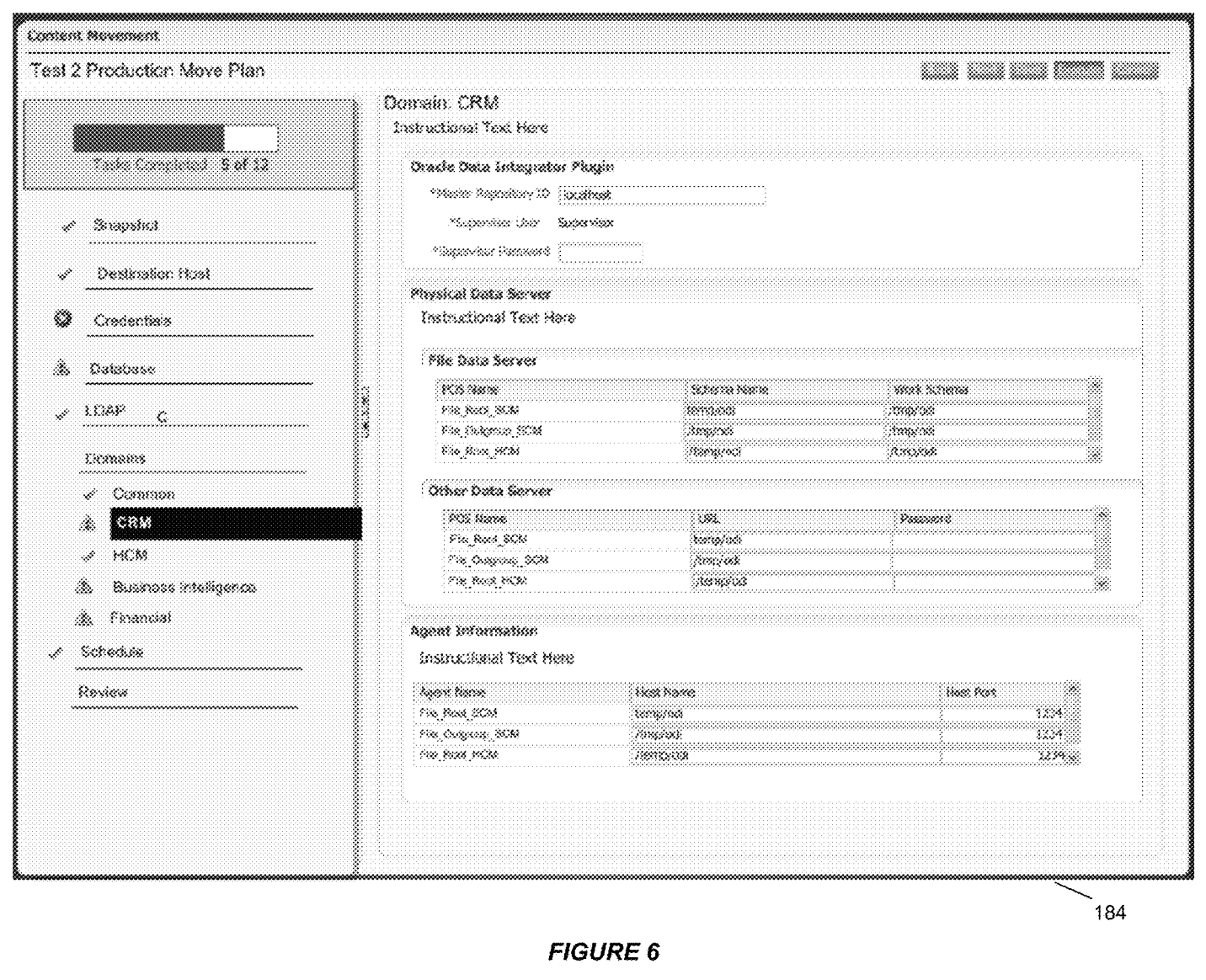
Figure 7:
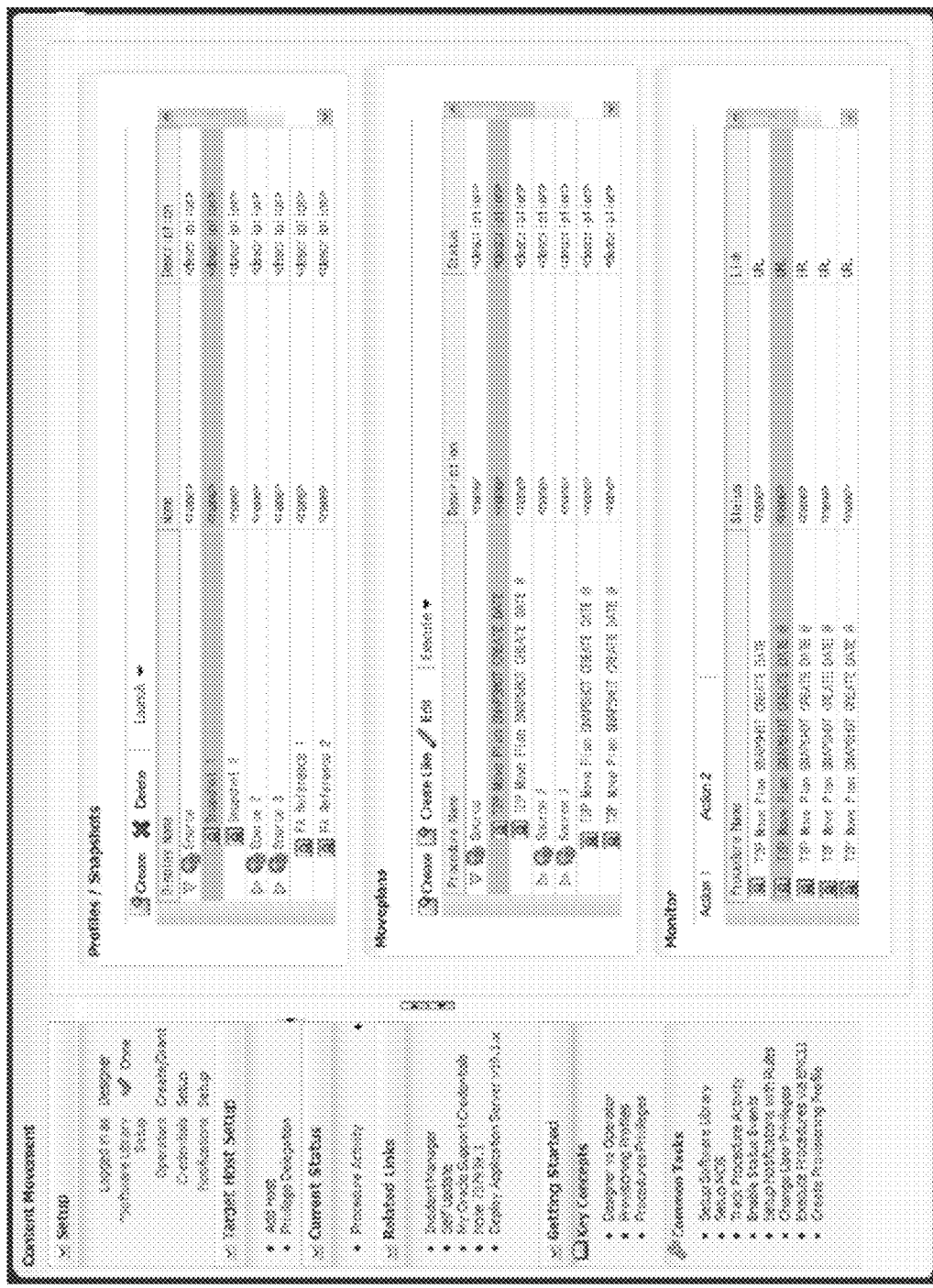
FIG. 7 further illustrates a user interface for use in moving components of an enterprise software application, in accordance with an embodiment.

For example, as shown in FIG. 4, in accordance with an embodiment, a user interface 180 can provide a plurality of interface screens that allows an administrator or other user to edit or otherwise specify one or more extract move plans, source move plans, or other movement configuration, or create snapshots of source environments. As further shown in FIG. 5, the user interface 182 can also allow the administrator to configure a target environment that will receive the enterprise software application components. As further shown in FIG. 6, the administrator can also use the user interface 184 to edit or otherwise specify one or more production move plans. As further shown in FIG. 7, the user interface 186 can also allow the administrator to view snapshots of source environments, and to otherwise control/monitor the entire move process.

The example interface screens shown in FIGS. 4-7 are provided by way of illustration, and in accordance with a particular embodiment. In accordance with other embodiments and examples, additional and/or other types of user interfaces, interface screens, and configuration options can be provided, to allow the administrator to control/monitor the move process.

Figure 8:
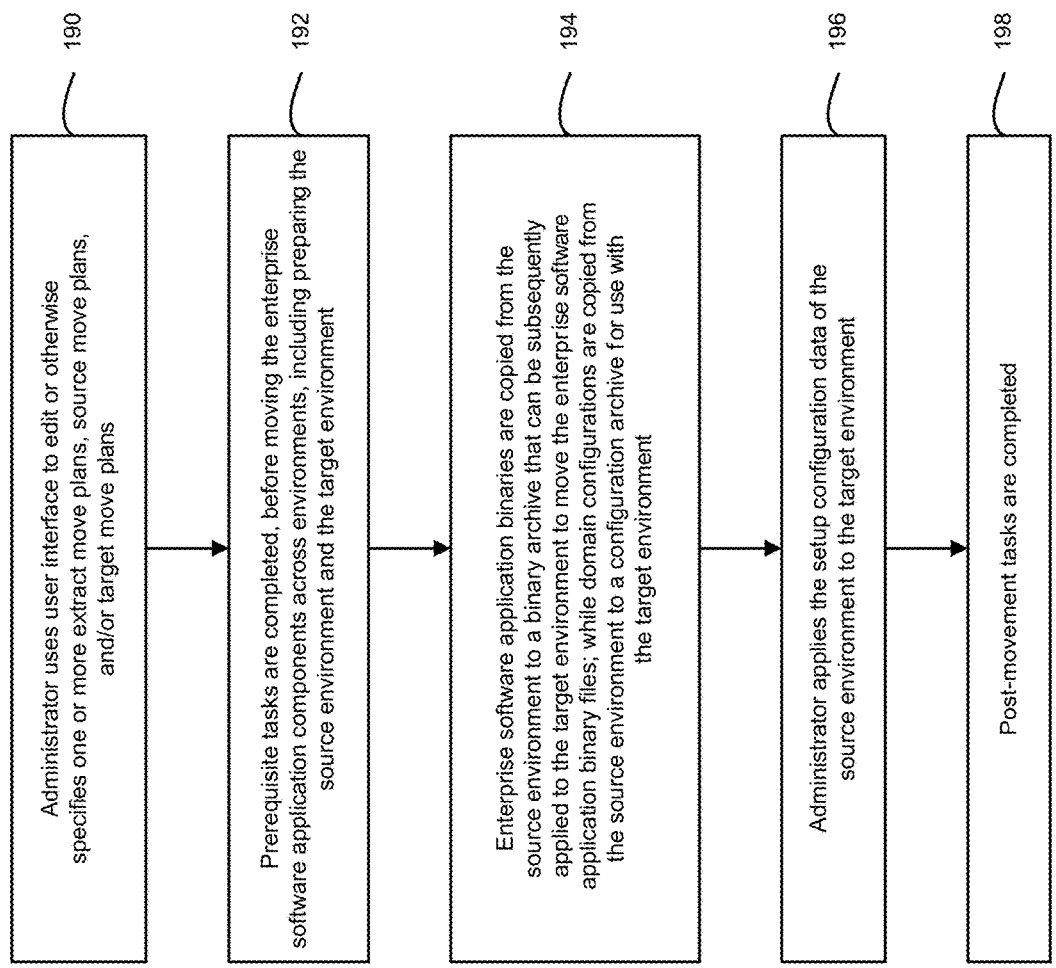
FIG. 8 is a flowchart that illustrates a process of moving components of an enterprise software application between different execution environments, in accordance with an embodiment.

FIG. 8 is a flowchart that illustrates a process of moving components of an enterprise software application between different execution environments, in accordance with an embodiment. As shown in FIG. 8, at step 190, the administrator or other user can use the user interface, or otherwise specify, e.g., through the use of scripts, one or more extract move plans, source move plans, target move plans, or other movement configuration, for use with a source environment and/or target environment. At step 192, any prerequisite tasks, such as those described above, are performed before moving the enterprise software application components across the source and target environments. At step 194, enterprise software application binaries are copied by the system, from the source environment to a binary archive, that can be subsequently applied to the target environment to move the enterprise software application binary files; while domain configurations are copied from the source environment to a configuration archive, for use with the target environment. At step 196, depending on their particular needs, the administrator can apply setup data of the source environment to the target environment, and, at step 198, perform any necessary post-movement tasks.

Figure 9:
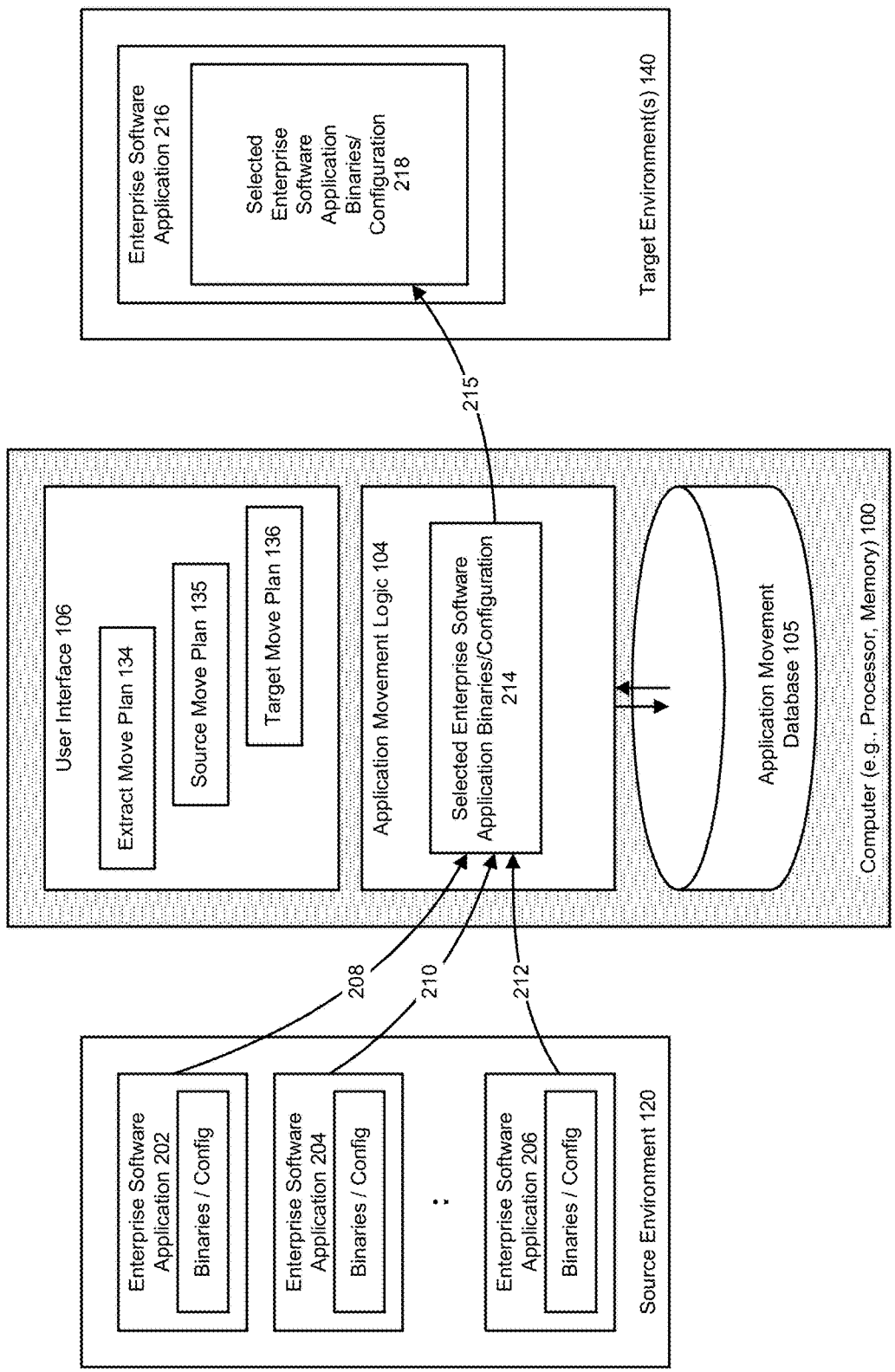
FIG. 9 illustrates the selection of one of several different enterprise software application source environment configurations, for pasting to a target environment, in accordance with an embodiment.

FIG. 9 illustrates the selection of one of several different enterprise software application source environment configurations, for pasting to a target environment, in accordance with an embodiment. As shown in FIG. 9, in accordance with an embodiment, the administrator can use the user interfaces and/or scripts, to select one or more different enterprise software application configurations 202, 204, 206 from a source environment, and copy those configurations 208, 210, 212 as selected enterprise software application binaries/configurations 214. Subsequently, a selected set of binaries/configuration can be installed 216, 218 to a target environment at a destination system.

Figure 10:
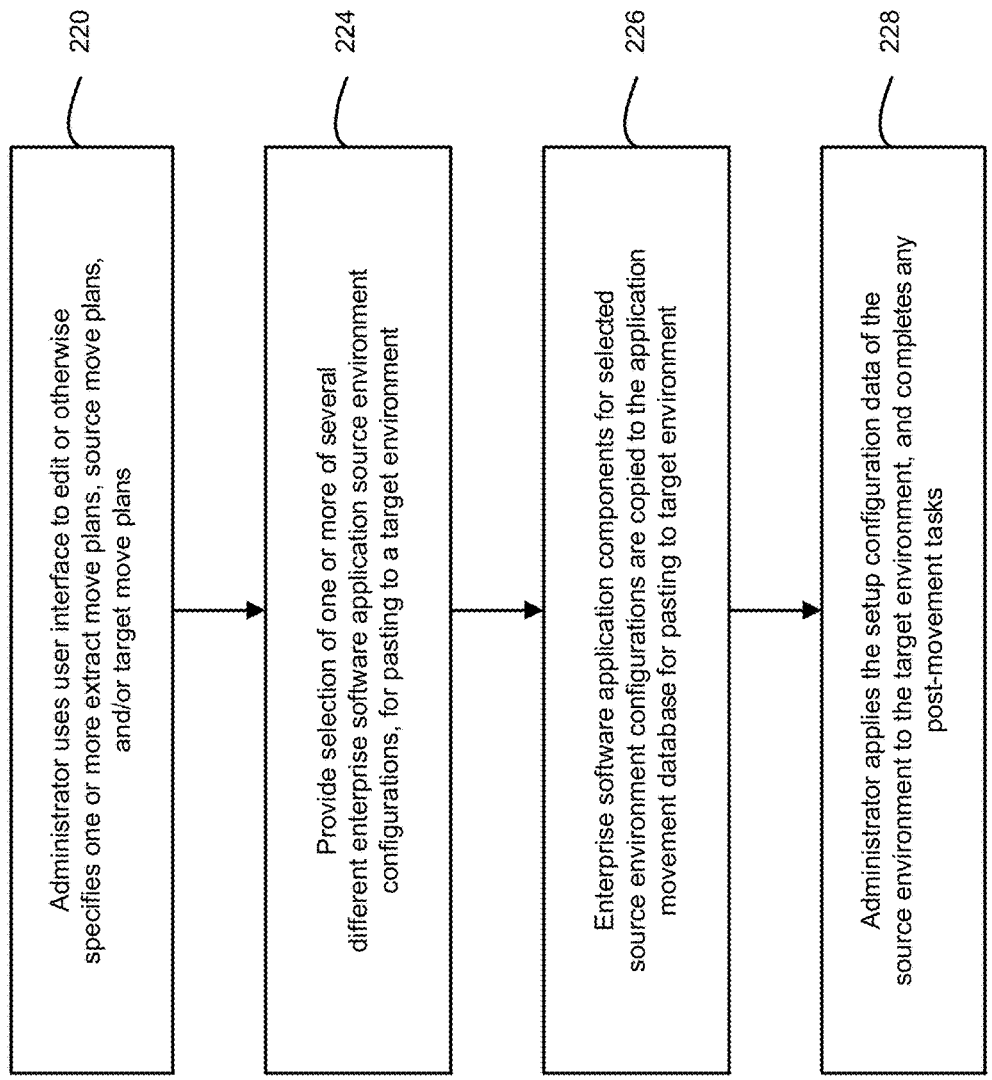
FIG. 10 is a flowchart of a process for selection of one of several different enterprise software application source environment configurations, for pasting to a target environment, in accordance with an embodiment.

FIG. 10 is a flowchart of a process for selection of one of several different enterprise software application source environment configurations, for pasting to a target environment, in accordance with an embodiment. As shown in FIG. 10, at step 220, the administrator can use the user interface to edit, or otherwise specifies, one or more extract move plans, source move plans, target move plans, or other movement configuration. At step 224, the administrator provides a selection of one or more of several different enterprise software application source environment configurations, for pasting to a target environment. At step 226, the enterprise software application components for the selected source environment configurations are copied by the system to the application movement database, for pasting to the target environment. At step 228, the administrator can apply the setup configuration data of the source environment to the target environment, and complete any post-movement tasks, as described previously.

Figure 11:
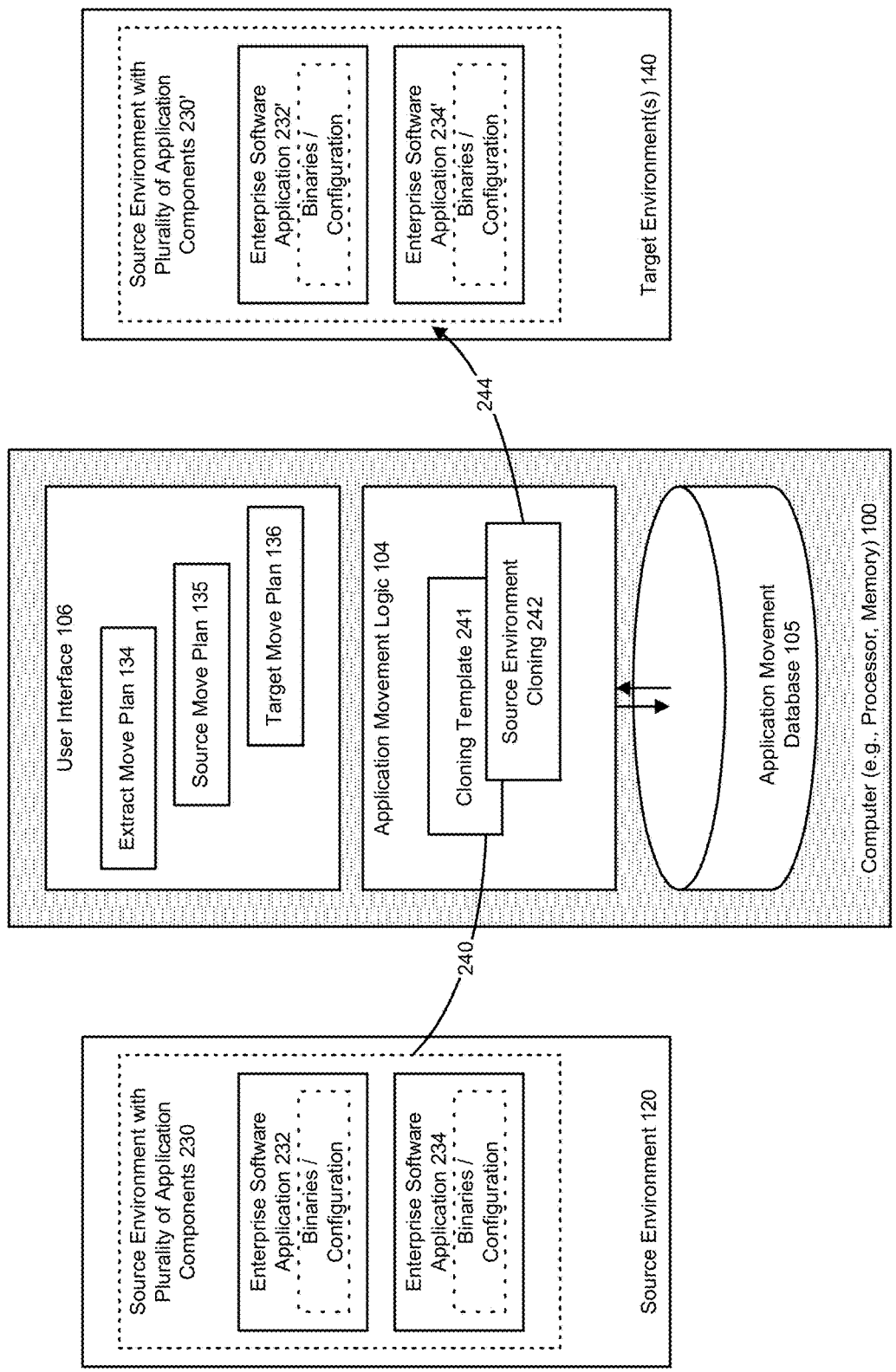
FIG. 11 illustrates the cloning of an enterprise software application source environment, in accordance with an embodiment.

FIG. 11 illustrates the cloning an enterprise software application source environment, in accordance with an embodiment. As shown in FIG. 11, in accordance with an embodiment, the administrator can use the user interfaces, or scripts, to select a source environment 230 that includes a plurality of enterprise software applications 232, 234, each with their own binaries and configurations; and a master or cloning template 241; and use these to copy 240 those binaries and configuration as exact clones 242, 244, to the target environment.

Figure 12:
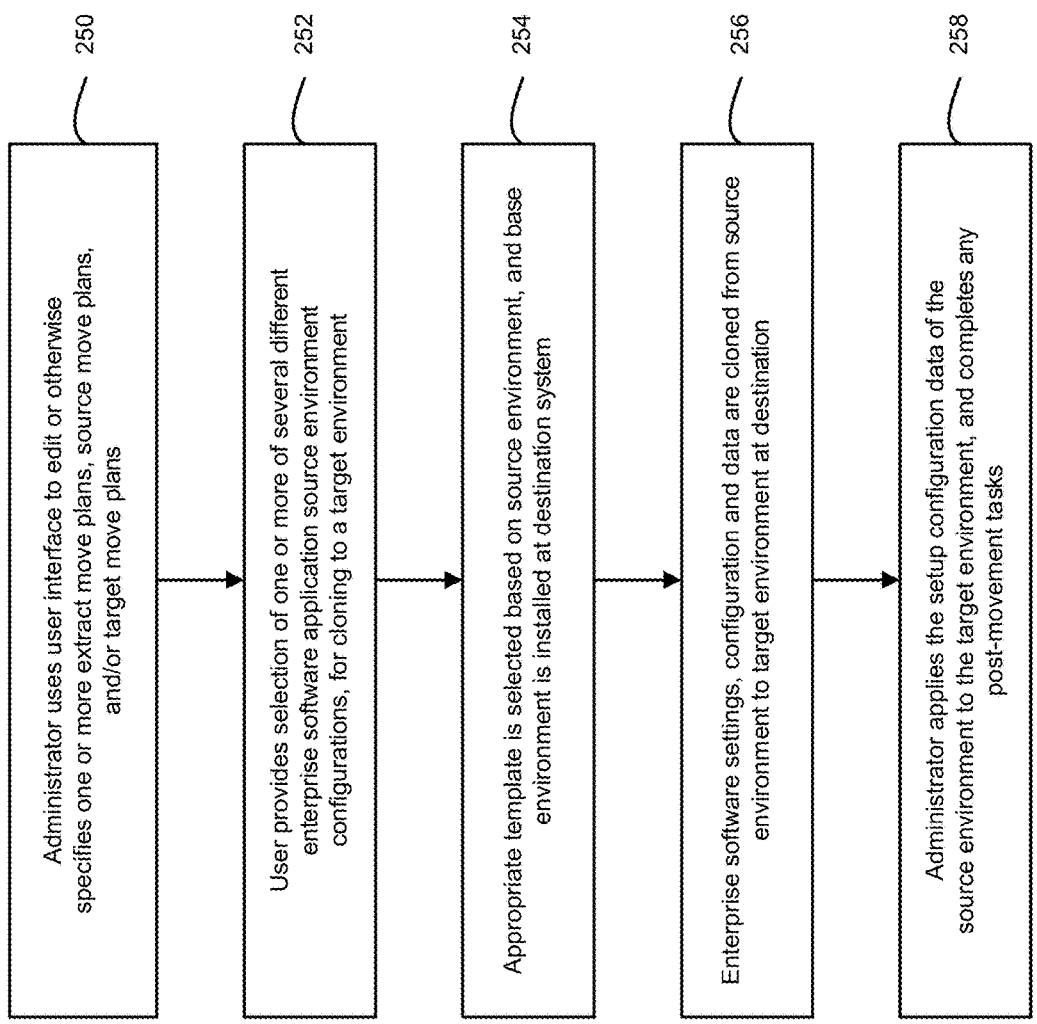
FIG. 12 is a flowchart of a process for cloning an enterprise software application source environment, in accordance with an embodiment.

FIG. 12 is a flowchart of a process for cloning of an enterprise software application source environment, in accordance with an embodiment. As shown in FIG. 12, at step 250, the administrator can use the user interface to edit, or otherwise specifies, one or more extract move plans, source move plans, target move plans, or other movement configuration. At step 252, the administrator provides a selection of one or more of several different enterprise software application source environment configurations, for cloning to a target environment. At step 254, an appropriate master or cloning template is selected based on the source environment, and a base environment is installed at the destination system. At step 256, enterprise software settings, configuration and data are cloned by the system from the source environment to a target environment at a destination system. At step 258, the administrator can apply the setup configuration data of the source environment to the target environment, and complete any post-movement tasks, as described previously.

Movement Scenarios

In accordance with an embodiment, the systems and methods described herein can be used to support various different types of movement scenario (e.g., full replication, delta replication), and various features for use with the movement scenarios (e.g., data obfuscation). Several examples of movement scenarios and features are described below. In accordance with other embodiments, additional and/or other types of movement scenarios and features can be supported.

Figure 13:
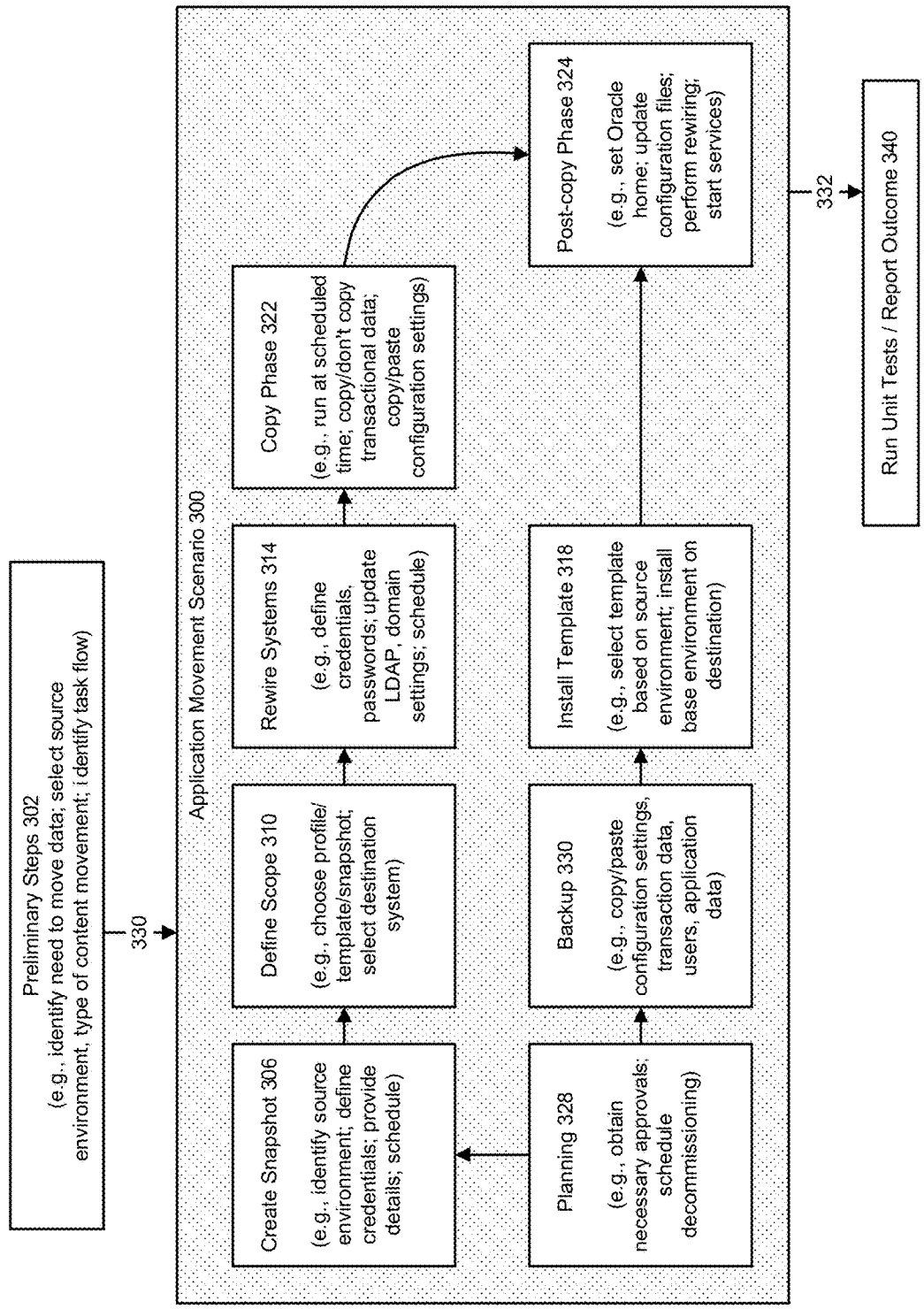
FIG. 13 illustrates how the system can be used for moving components of an enterprise software application, using different movement scenarios, in accordance with an embodiment.

FIG. 13 illustrates how the system can be used for moving components of an enterprise software application, using different movement scenarios, in accordance with an embodiment. As shown in FIG. 13, an application movement scenario can include a series of components or steps that can be combined to suit a particular scenario. Examples of such components or steps include:

Preliminary steps 302 (e.g., identifying a need to move data; selecting a source environment or type of content movement; identifying a task flow);

Creating a snapshot 306 (e.g., identifying a source environment; defining credentials; providing any additional details; scheduling);

Defining a movement scope 310 (e.g., choosing a profile/template/snapshot; Selecting a destination system);

Rewiring destination systems 314 (e.g., defining credentials, passwords; updating LDAP, domain settings; scheduling);

Copying application components 322 (e.g., running the movement at a scheduled time; a means of specifying copy/don't copy transactional data; copy/paste configuration settings);

Planning 328 (e.g., obtaining necessary approvals; scheduling decommissioning); creating backups 330 (e.g., copy/paste configuration settings, transaction data, users, application data);

Using install templates 318 (e.g., selecting a template based on source environment; install base environment on destination);

Post-copy phase 324 (e.g., set Oracle home; update configuration files; perform rewiring; start services); and The ability to run unit tests and/or report on the outcome of the movement scenario 340.

The movement scenario and components or steps illustrated in FIG. 13 are provided by way of example. In accordance with other embodiments, additional and/or other movement scenarios, features, and components or steps can be supported.

Full Replication (Greenfield)

In accordance with an embodiment, a full replication scenario (also referred to as a Greenfield scenario) enables an enterprise application customer to create a source environment, ensure that their source environment works as desired, and subsequently replicate that source environment to a target environment (which initially does not exist). In accordance with an embodiment, all of the replicas contain the same initial state.

Figure 14:
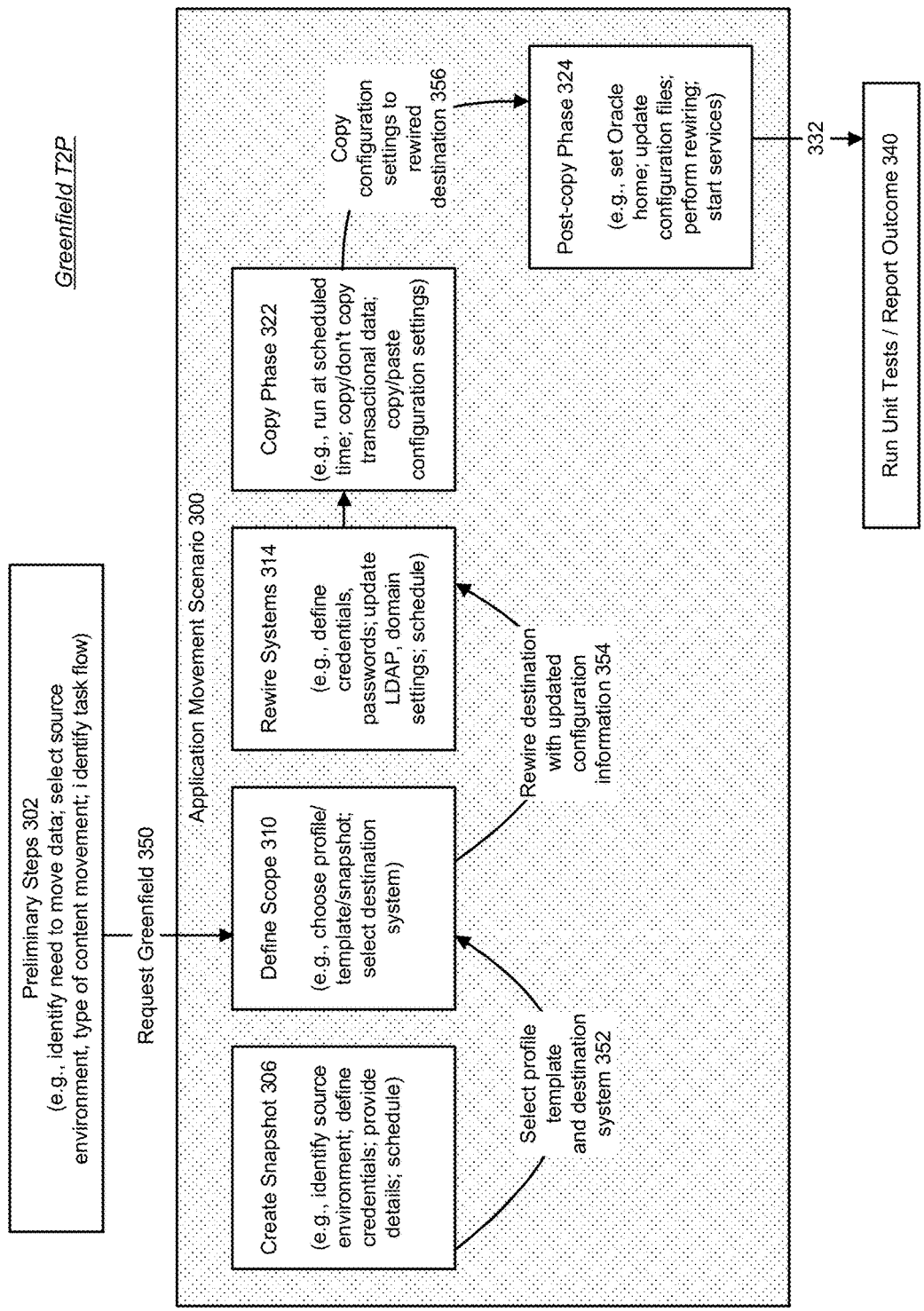
FIG. 14 illustrates the use of the system with a full replication scenario, in accordance with an embodiment.

FIG. 14 illustrates the use of the system with a full replication or Greenfield scenario, in accordance with an embodiment. As shown in FIG. 14, when using a Greenfield scenario, the administrator can request a Greenfield movement 350; select a source environment and a profile template, and a destination system 352; rewire the destination with updated configuration information to accept the source environment 354; and copy the configuration settings to the rewired destination 356.

Production-to-Test (P2T) Movement

In accordance with an embodiment, an enterprise application administrator may want to move an environment from a production environment to a test environment, perhaps for testing. In such a scenario, it may be useful to mask or otherwise modify the production data, to address privacy concerns.

In accordance with an embodiment, data masking is the process of obscuring (masking) specific data elements within data stores, and ensures that sensitive data is replaced with realistic but not real data. Data masking is typically performed while provisioning non-production environments, so that copies created to support test and development processes are not exposing sensitive information. Effective data masking requires the alteration of data in such a way that the actual values cannot be determined or re-engineered; but that functional appearance is maintained, so effective testing is possible. Common methods of data masking include:

Encryption/decryption—encryption algorithmically scrambles the data; however this may not leave the data looking realistic and can sometimes make the data larger.

Masking (i.e. numbers letters), including masking out—if two tables contain the columns with the same denormalized data values and those columns are masked in one table then the second table will need to be updated with the changes.

Substitution (for example, replacing all female names="Julie").

Shuffling (for example, zip code 12345 becomes 53412). The shuffling technique uses the existing data as its own substitution dataset and moves the values between rows in such a way that the no values are present in their original rows.

Number and Date Variance. This technique varies the existing values in a specified range in order to obfuscate them. For example, birth date values could be changed within a range of +/−60 days.

Nulling Out or Deletion—The nulling out technique simply removes the sensitive data by deleting it.

Figure 15:
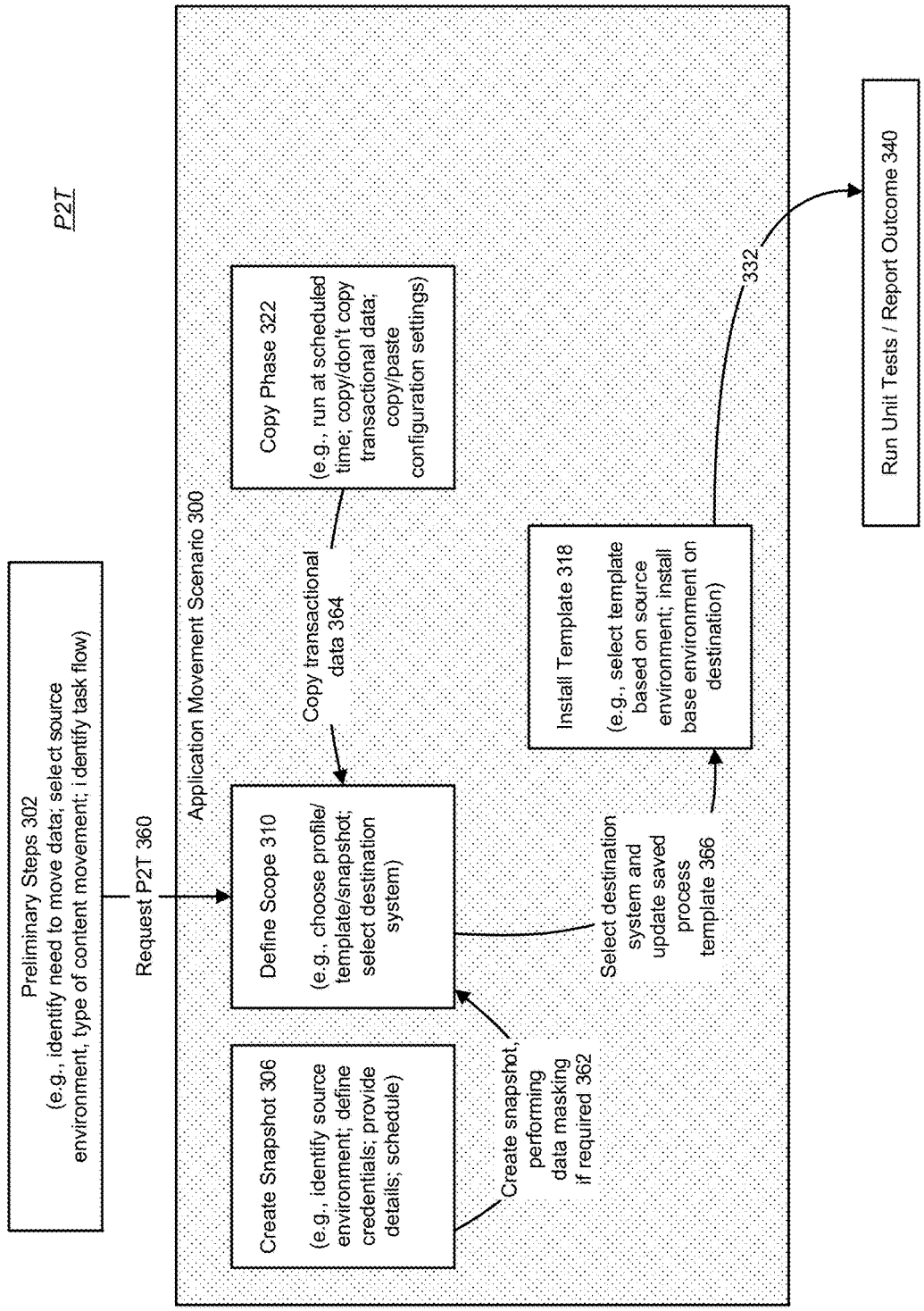
FIG. 15 illustrates the use of the system with a production-to-test (P2T) scenario, in accordance with an embodiment.

FIG. 15 illustrates the use of the system with a production-to-test (P2T) scenario, in accordance with an embodiment. As shown in FIG. 15, when using a production-to-test (P2T) scenario, the administrator can request a P2T movement 360. The system can then be used to create a snapshot, including performing any data masking if required 362; and copying any transactional data 364. The administrator can then select a destination system and update their saved process template 366, to move the data from the production environment, to the target (test) environment.

Cloning (Golden Template)

In accordance with an embodiment, a cloning scenario (also referred to as a Golden Template scenario) is a special example of the full replication scenario, wherein the resulting target environment will have an identical topology as the source. The enterprise application customer can create a source environment, and test it to ensure it can be used as a master or cloning template; and can then propagate the source environment to create many identical target environments.

Figure 16:
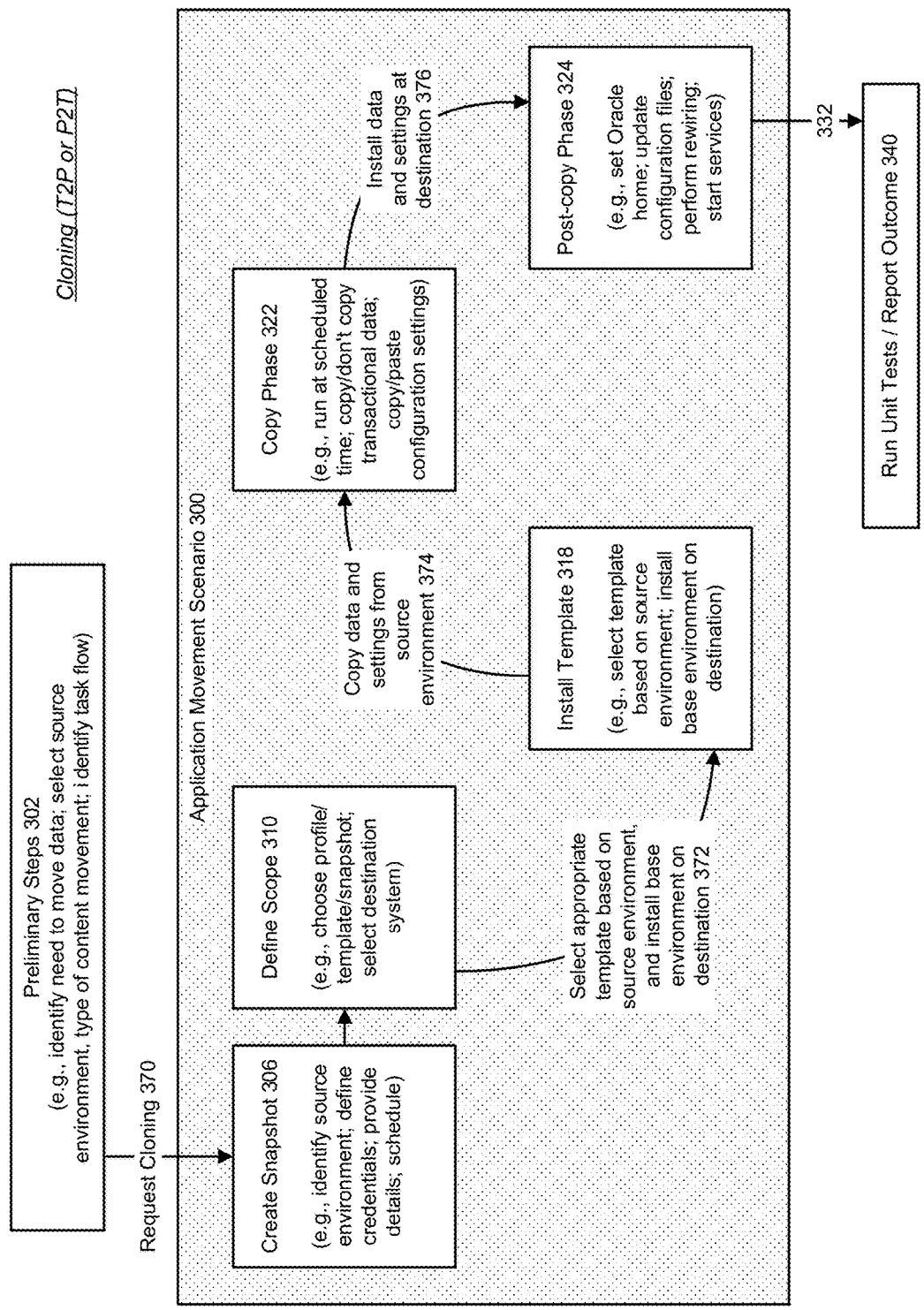
FIG. 16 illustrates the use of the system with a cloning (T2P or P2T) scenario, in accordance with an embodiment.

FIG. 16 illustrates the use of the system with a cloning (T2P or P2T) scenario, in accordance with an embodiment. As shown in FIG. 16, when using a cloning (T2P or P2T) scenario, the administrator can request cloning 370; select an appropriate master or cloning template based on the source environment, and install a base environment on the destination 372. The system can then be used to copy data and settings from the source environment 374; and install the data and settings at the destination 376.

Decommissioning

Figure 17:
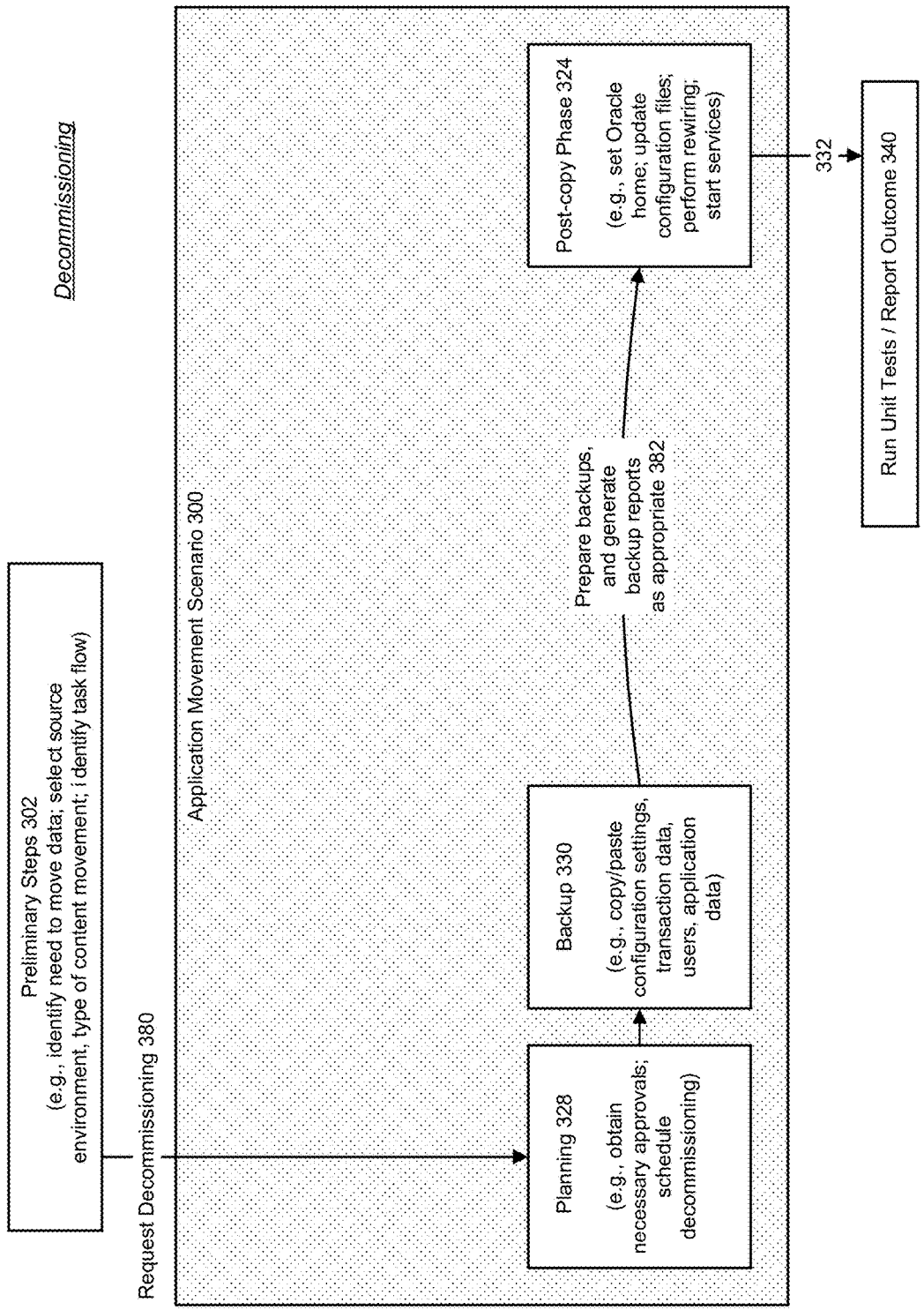
FIG. 17 illustrates the use of the system with a decommissioning scenario, in accordance with an embodiment.

The decommissioning process begins when an enterprise application licensee /customer decides to permanently cease using the enterprise application product operations. FIG. 17 illustrates the use of the system with a decommissioning scenario, in accordance with an embodiment. As shown in FIG. 17, when using a decommissioning scenario, the system can be instructed to request decommissioning 380, prepare any necessary backups, and generate backup reports as appropriate 382.

Delta Replication

Figure 18:
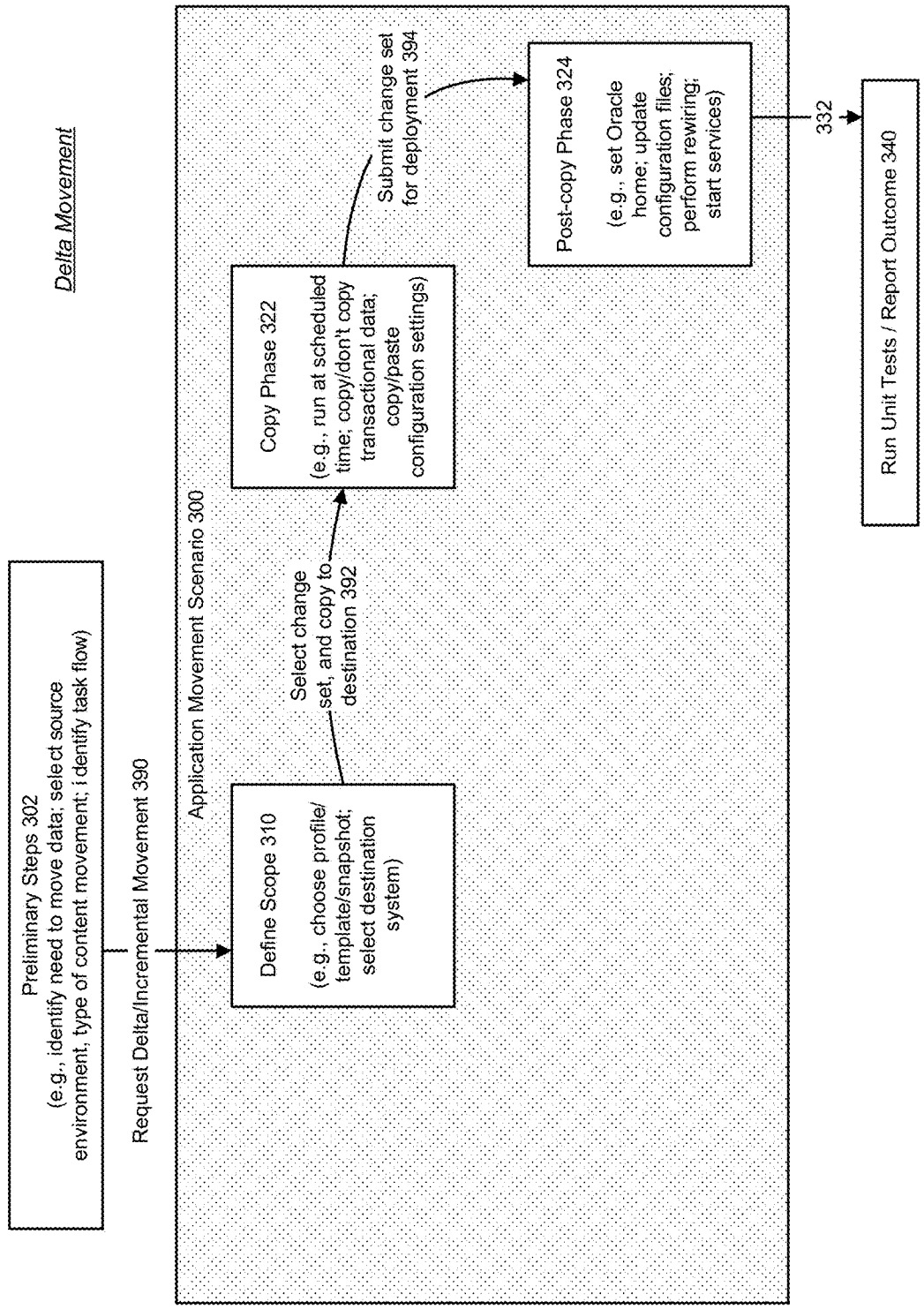
FIG. 18 illustrates the use of the system with a delta movement scenario, in accordance with an embodiment.

In accordance with an embodiment, a delta replication scenario, (also referred to as a change control or subset data movement scenario), can be used when the enterprise application customer has a working production setup, and wishes to test patches and configuration changes, before rolling them into their production environment. FIG. 18 illustrates the use of the system with a delta movement scenario, in accordance with an embodiment. As shown in FIG. 18, when using a delta movement scenario, the administrator can request a delta/incremental movement 390; select an appropriate change set, and use the system to copy that change set to a destination 392, and/or submit a change set for later deployment 394.

System Deployment

In accordance with an embodiment, the system can be provided as an on-premise deployment, wherein the infrastructure is installed at the enterprise application customer's location . Alternatively, in accordance with other embodiments, the system can be provided as a Software as a Service (SaaS) deployment hosted by a vendor or third party.

Multitenant Support

In accordance with an embodiment, the system can be used in combination with multitenancy systems to serve multiple client organizations (tenants). With a multitenant architecture, a software application is designed to virtually partition its data and configuration, and each client organization works with a customized virtual application instance.

Service-Level Agreement

In accordance with an embodiment, the system can recognize a service-level agreement (SLA) as part of a service contract where the level of service is formally defined.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for use in moving components of an enterprise software application between a source environment and a target environment, comprising:
   one or more computers, each including a processor and memory;
   an application movement database that stores binary archives and configuration archives associated with enterprise software applications that are configurable to run as instances at the source environment and target environment;
   a user interface, which provides one or more interface screens that allows an administrator to define:
      the source environment that includes a source domain and a source instance of the enterprise software application-running at the source environment,
      the target environment,
      one or more move plans for use in moving components of the enterprise software application between the source environment and target environment, and
      a cloning template that is selected based on the source environment:
   an application movement logic that performs movement of the components of the enterprise software application between the source environment and the target environment, as defined by the administrator and the one or more move plans, including that the application movement logic is configured to:
      copy binaries of the components of the source instance of the enterprise software application from the source environment to an enterprise software application home archive on the application movement database, and
      copy configuration artifacts associated with the source instance of the enterprise software application from the source domain in the source environment to a configuration archive on the application movement database,
   wherein a source move plan from the source environment is editable via the user interface to specify properties related to a target domain of the target environment to define a target move plan;
   wherein the application movement logic is configured to:
      clone the binaries and the configuration artifacts from the source environment to the target environment using the selected cloning template, and
      apply post-movement setup tasks to configure the enterprise application for the target environment, wherein the application movement logic enables delta replication of the enterprise software application between the source environment and the target environment to request a delta and incremental movement, including replicating selected portions of the source environment to the target environment to submit a change set for later deployment.

2. The system of claim 1, further comprising a movement application program interface, and a plugin associated with each component of the enterprise software application, that enables binaries and configuration artifacts associated with that component to be imported from the source environment, and exported to the target environment.

3. The system of claim 1, wherein the application movement logic enables full replication of the enterprise software application between the source environment and the target environment, including creating a copy of ail of the data and topology in the source environment.

4. The system of claim 1, wherein the movement of the enterprise software application between the source environment and the target environment includes creating the same topology as the source environment.

5. The system of claim 1, wherein the application movement logic performs data masking while moving data from the source environment to the target environment, to allow for testing or other purposes.

6. The system of claim 1,
   wherein the application movement logic is usable to extract configuration settings from a plurality of configuration archives of the source environment into a source move plan; and
   wherein the user interface is usable to modify the source move plan to create one or more target move plans.

7. A method for moving components of an enterprise software application between a source environment and a target environment, comprising the steps of:
   providing an application movement database that stores binary archives and configuration archives associated with enterprise software applications that are configurable to run as instances at the source environment and target environment;
   providing a user interface, which provides one or more interface screens that allows an administrator to define:
      the source environment that includes a source domain and a source instance of the enterprise software application running at the source environment, the target environment,
one or more move plans for use in moving components of the enterprise software application between the source environment and target environment, and
a cloning template that is selected based on the source environment;
providing an application movement logic that performs movement of the components of the enterprise software application between the source environment and the target environment, as defined by the administrator and the one or more move plans, including that the application movement logic is configured to:
copy binaries of the components of the source instance of the enterprise software application from the source environment to an enterprise software application home archive on the application movement database, and
copy configuration artifacts associated with the source instance of the enterprise software application from the source domain in the source environment to a configuration archive on the application movement database,
wherein a source move plan from the source environment is editable via the user interface to specify properties related to a target domain of the target environment to define a target move plan;
wherein the application movement logic is configured to:
clone the binaries and the configuration artifacts from the source environment to the target environment using the selected cloning template, and
apply post-movement setup tasks to configure the enterprise application for the target environment, wherein the application movement logic enables delta replication of the enterprise software application between the source environment and the target environment to request a delta and incremental movement, including replicating selected portions of the source environment to the target environment to submit a change set for later deployment.

8. The method of claim 7, further comprising providing a movement application program interface, and a plugin associated with each component of the enterprise software application, that enables binaries and configuration artifacts associated with that component to be imported from the source environment, and exported to the target environment.

9. The method of claim 7, wherein the application movement logic enables full replication of the enterprise software application between the source environment and the target environment, including creating a copy of all of the data and topology in the source environment.

10. The method of claim 7, wherein the movement of the enterprise software application between the source environment and the target environment includes creating the same topology as the source environment.

11. The method of claim 7, wherein the application movement logic performs data masking while moving data from the source environment to the target environment, to allow for testing or other purposes.

12. The method of claim 7,
wherein the application movement logic is usable to extract configuration settings from a plurality of configuration archives of the source environment into a source move plan; and
wherein the user interface is usable to modify the source move plan to create one or more target move plans.

13. A non-transitory computer-readable storage medium including instructions stored thereon which when read and executed by a computer cause the computer to perform the steps comprising:
providing an application movement database that stores binary archives and configuration archives associated with enterprise software applications that are configurable to run as instances at the source environment and target environment;
providing a user interface, which provides one or more interface screens that allows an administrator to define:
the source environment that includes a source domain and a source instance of the enterprise software application running at the source environment,
the target environment,
one or more move plans for use in moving components of the enterprise software application between the source environment and target environment, and
a cloning template that is selected based on the source environment;
providing an application movement logic that performs movement of the components of the enterprise software application between the source environment and the target environment, as defined by the administrator and the one or more move plans, including that the application movement logic is configured to:
copy binaries of the components of the source instance of the enterprise software application from the source environment to an enterprise software application home archive on the application movement database, and
copy configuration artifacts associated with the source instance of the enterprise software application from the source domain in the source environment to a configuration archive on the application movement database,
wherein a source move plan from the source environment is editable via the user interface to specify properties related to a target domain of the target environment to define a target move plan;
wherein the application movement logic is configured to:
clone the binaries and the configuration artifacts from the source environment to the target environment using the selected cloning template, and
apply post-movement setup tasks to configure the enterprise application for the target environment, wherein the application movement logic enables delta replication of the enterprise software application between the source environment and the target environment to request a delta and incremental movement, including replicating selected portions of the source environment to the target environment to submit a change set for later deployment.

14. The non-transitory computer-readable storage medium of claim 13, wherein the application movement logic enables full replication of the enterprise software application between the source environment and the target environment, including creating a copy of all of the data and topology in the source environment.

15. The non-transitory computer-readable storage medium of claim 13, wherein the movement of the enterprise software application between the source environment and the target environment includes creating the same topology as the source environment.

16. The non-transitory computer-readable storage medium of claim 13, wherein the application movement logic performs data masking while moving data from the source environment to the target environment, to allow for testing or other purposes.

17. The non-transitory computer-readable storage medium of claim 13,
   wherein the application movement logic is usable to extract configuration settings from a plurality of configuration archives of the source environment into a source move plan; and
   wherein the user interface is usable to modify the source move plan to create one or more target move plans.

* * * * *

UNITED STATES PATENT AND TRADEMARK OFFICE
CERTIFICATE OF CORRECTION

PATENT NO. : 10,282,196 B2
APPLICATION NO. : 13/782642
DATED : May 7, 2019
INVENTOR(S) : Ursal et al.

It is certified that error appears in the above-identified patent and that said Letters Patent is hereby corrected as shown below:

In the Drawings

On sheet 13 of 18, in FIGURE 13, under Reference Numeral 302, Line 3, delete "i dentify" and insert -- identify --, therefor.

On sheet 14 of 18, in FIGURE 14, under Reference Numeral 302, Line 3, delete "i dentify" and insert -- identify --, therefor.

On sheet 15 of 18, in FIGURE 15, under Reference Numeral 302, Line 3, delete "i dentify" and insert -- identify --, therefor.

On sheet 16 of 18, in FIGURE 16, under Reference Numeral 302, Line 3, delete "i dentify" and insert -- identify --, therefor.

On sheet 17 of 18, in FIGURE 17, under Reference Numeral 302, Line 3, delete "i dentify" and insert -- identify --, therefor.

On sheet 18 of 18, in FIGURE 18, under Reference Numeral 302, Line 3, delete "i dentify" and insert -- identify --, therefor.

In the Specification

In Column 12, Line 57, delete "location ." and insert -- location. --, therefor.

In the Claims

In Column 13, Line 61, in Claim 1, delete "environment:" and insert -- environment; --, therefor.

In Column 14, Line 38, in Claim 3, delete "ail" and insert -- all --, therefor.

Signed and Sealed this
Twenty-first Day of July, 2020

Andrei Iancu
*Director of the United States Patent and Trademark Office*